US009152434B2

(12) United States Patent
Mayer-Ullmann et al.

(10) Patent No.: US 9,152,434 B2
(45) Date of Patent: Oct. 6, 2015

(54) ENTERPRISE USER INTERFACE CUSTOMIZATION

(75) Inventors: Dietrich Mayer-Ullmann, Ilvesheim (DE); Erdal Kayacan, Frankfurt (DE); Clare Johnson, Mannheim (DE); Hanna Kieser, Wiesloch (DE); Matthias Berger, Wiesloch (DE)

(73) Assignee: SAP SE, Walldorf (DE)

( * ) Notice: Subject to any disclaimer, the term of this patent is extended or adjusted under 35 U.S.C. 154(b) by 1944 days.

(21) Appl. No.: 11/736,774

(22) Filed: Apr. 18, 2007

(65) Prior Publication Data
US 2008/0263462 A1 Oct. 23, 2008

(51) Int. Cl.
G06F 9/44 (2006.01)
(52) U.S. Cl.
CPC ............................ G06F 9/4443 (2013.01)
(58) Field of Classification Search
USPC ......... 715/731, 736, 743, 741, 739; 707/9, 10
See application file for complete search history.

(56) References Cited

U.S. PATENT DOCUMENTS

| 6,038,563 | A  | * | 3/2000 | Bapat et al. ................... 707/10 |
| 6,253,203 | B1 | * | 6/2001 | O'Flaherty et al. ............. 707/9 |
| 7,124,192 | B2 | * | 10/2006 | High et al. .................... 709/229 |
| 2005/0144072 | A1 | * | 6/2005 | Perkowski et al. ............. 705/14 |
| 2009/0119075 | A1 | * | 5/2009 | Jaworski et al. ................. 703/1 |
| 2009/0138826 | A1 | * | 5/2009 | Barros ......................... 715/841 |

* cited by examiner

Primary Examiner — Thanh Vu
(74) Attorney, Agent, or Firm — Schwegman Lundberg & Woessner, P.A.

(57) ABSTRACT

In one embodiment, a method is illustrated as rendering an application User Interface (UI) to be modified to reflect a use case, and initiating a guided procedure relating to the use of an elected privilege to modify the application UI. Further, in one embodiment, a method is illustrated as including displaying a configuration rule, the configuration rule used to govern a UI configuration, detecting a selection of the configuration rule as an elected privilege relating to modifying a UI element and a layout element, and storing the elected privilege. In some cases, the UI is a Customer Relationship Management (CRM) UI.

19 Claims, 23 Drawing Sheets

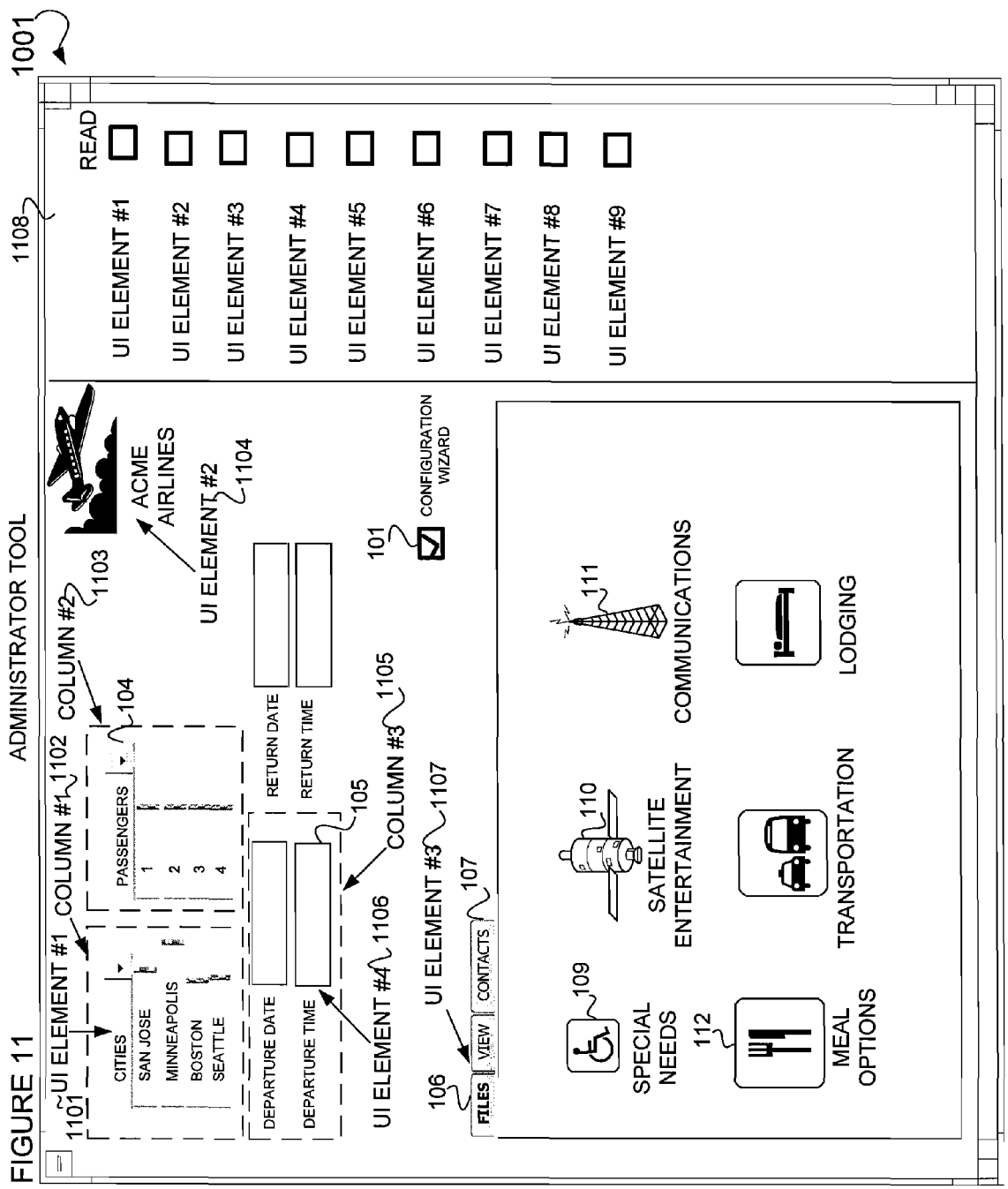

FIGURE 12 — PRIVILEGE SELECTION INTERFACE

| | READ ONLY | EDIT | DELETE | REPOSITION | GUIDE AVAILABLE |
|---|---|---|---|---|---|
| UI ELEMENT #1 | ☒ 1201 | ☐ | ☐ | ☐ | ☐ |
| UI ELEMENT #2 | ☐ | ☒ 1202 | ☒ 1203 | ☒ 1204 | ☐ |
| UI ELEMENT #3 | ☒ | ☐ | ☐ | ☐ | ☐ |
| UI ELEMENT #4 | ☒ | ☐ | ☐ | ☐ | ☒ 1205 |
| UI ELEMENT #5 | ☐ | ☐ | ☐ | ☒ 1206 | ☐ |
| UI ELEMENT #6 | ☐ | ☒ 1207 | ☐ | ☐ | ☐ |
| UI ELEMENT #7 | ☐ | ☒ | ☐ | ☐ | ☐ |
| UI ELEMENT #8 | ☐ | ☒ [SELECT PRIVILEGES] | ☐ | ☐ | ☐ |
| UI ELEMENT #9 | ☐ | ☒ | ☐ | ☐ | ☐ |

1108

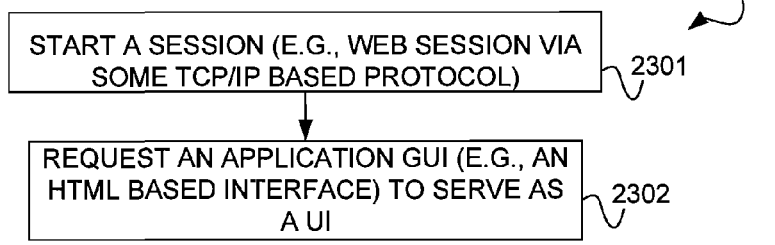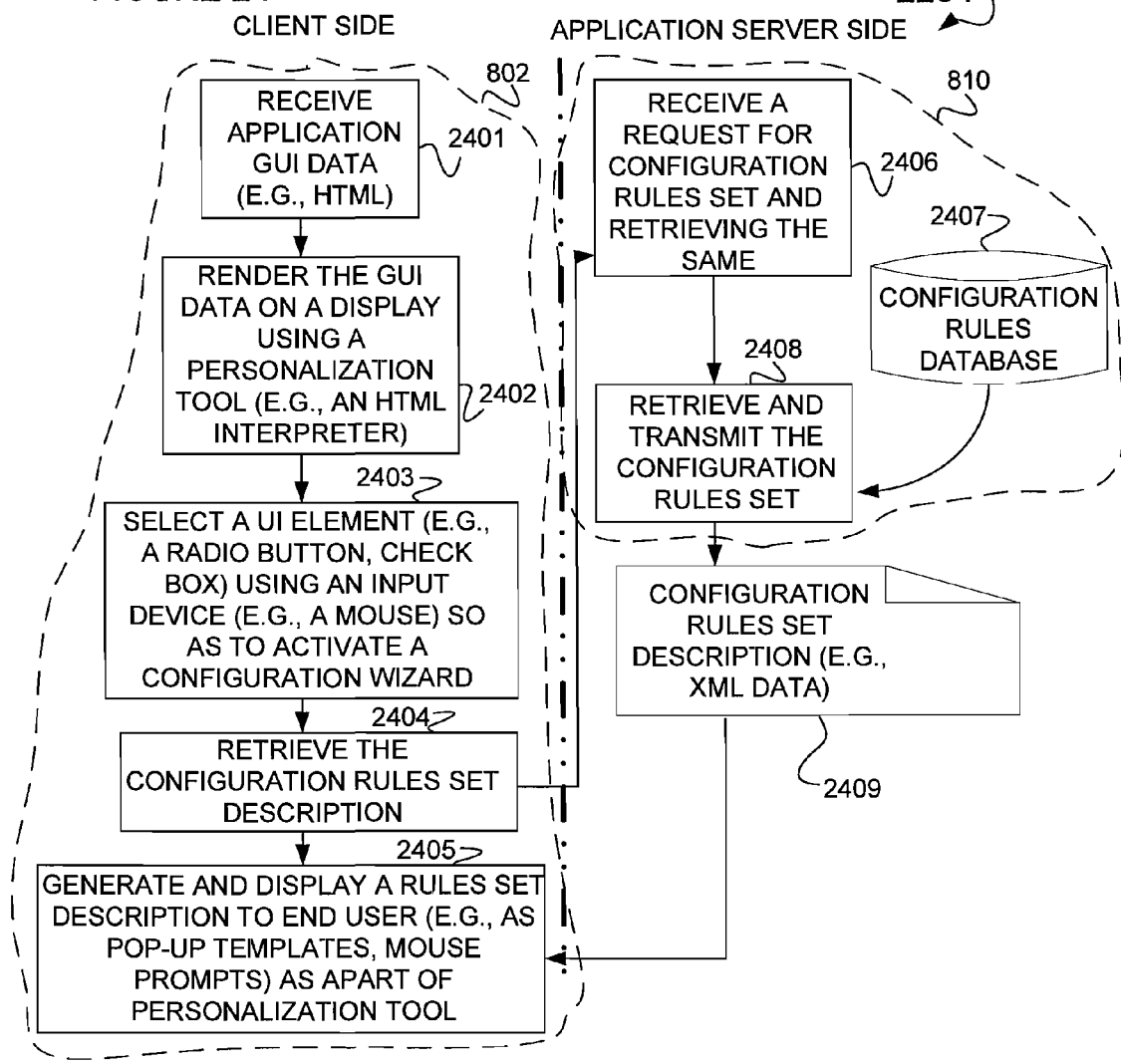

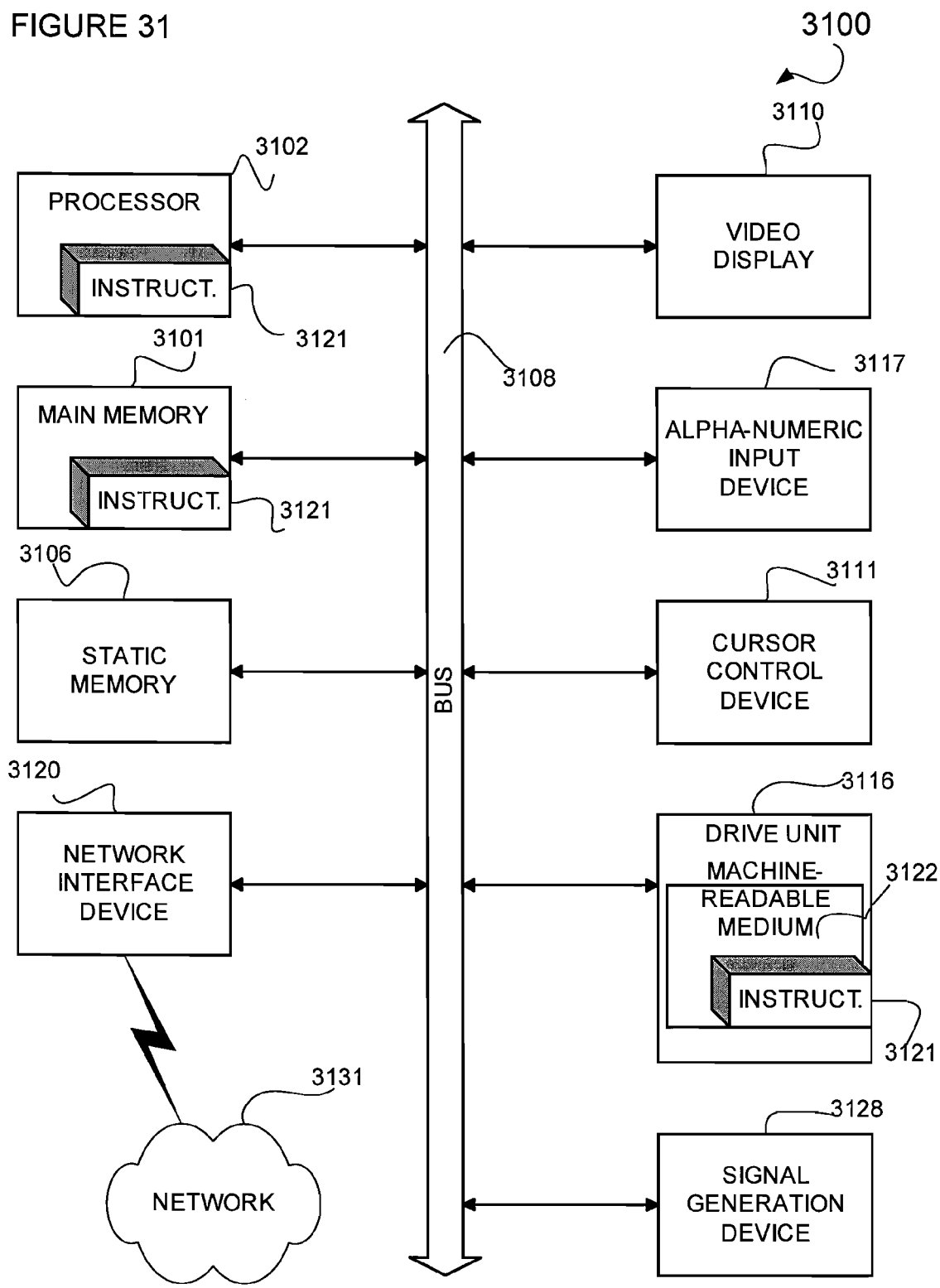

ENTERPRISE USER INTERFACE CUSTOMIZATION

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2007, SAP AG, All Rights Reserved.

TECHNICAL FIELD

The present application relates generally to the technical field of algorithms and programming and, in one specific example, to the customization of a User Interface (UI).

BACKGROUND

UIs come in many forms (e.g., a Graphical User Interface (GUI)) and can be used to facilitate an end user's interaction with, for example, a distributed computing environment (e.g., a web-based application), or an application residing wholly on a single computer system (e.g., a stand-alone application). Some UIs, such as those used in the commercial or enterprise context, have a layout of objects and widgets that is common to all versions of the UI. This layout of objects and widgets may be utilized even if it is not the most efficient layout for a particular end user's purposes.

BRIEF DESCRIPTION OF THE DRAWINGS

Some embodiments are illustrated by way of example and not limitation in the figures of the accompanying drawings in which:

FIG. 11 is a diagram of an interface for an administrator tool to set privileges for a UI such as a CRM-UI, according to an example embodiment.

FIG. 12 is a diagram of an interface in the form of a privilege selection interface for setting privileges for UI elements, according to an example embodiment.

FIG. 23 is a flowchart depicting a method used to implement an operation to request an application GUI, according to an example embodiment.

FIG. 24 is a dual stream flowchart depicting a method used to implement an operation that activates a configuration wizard wherein a configuration wizard may be activated through a UI element (e.g., a screen object or widget), according to an example embodiment.

FIG. 31 shows a diagrammatic representation of a machine in the form of a computer system, according to an example embodiment.

DETAILED DESCRIPTION

Figure 1:
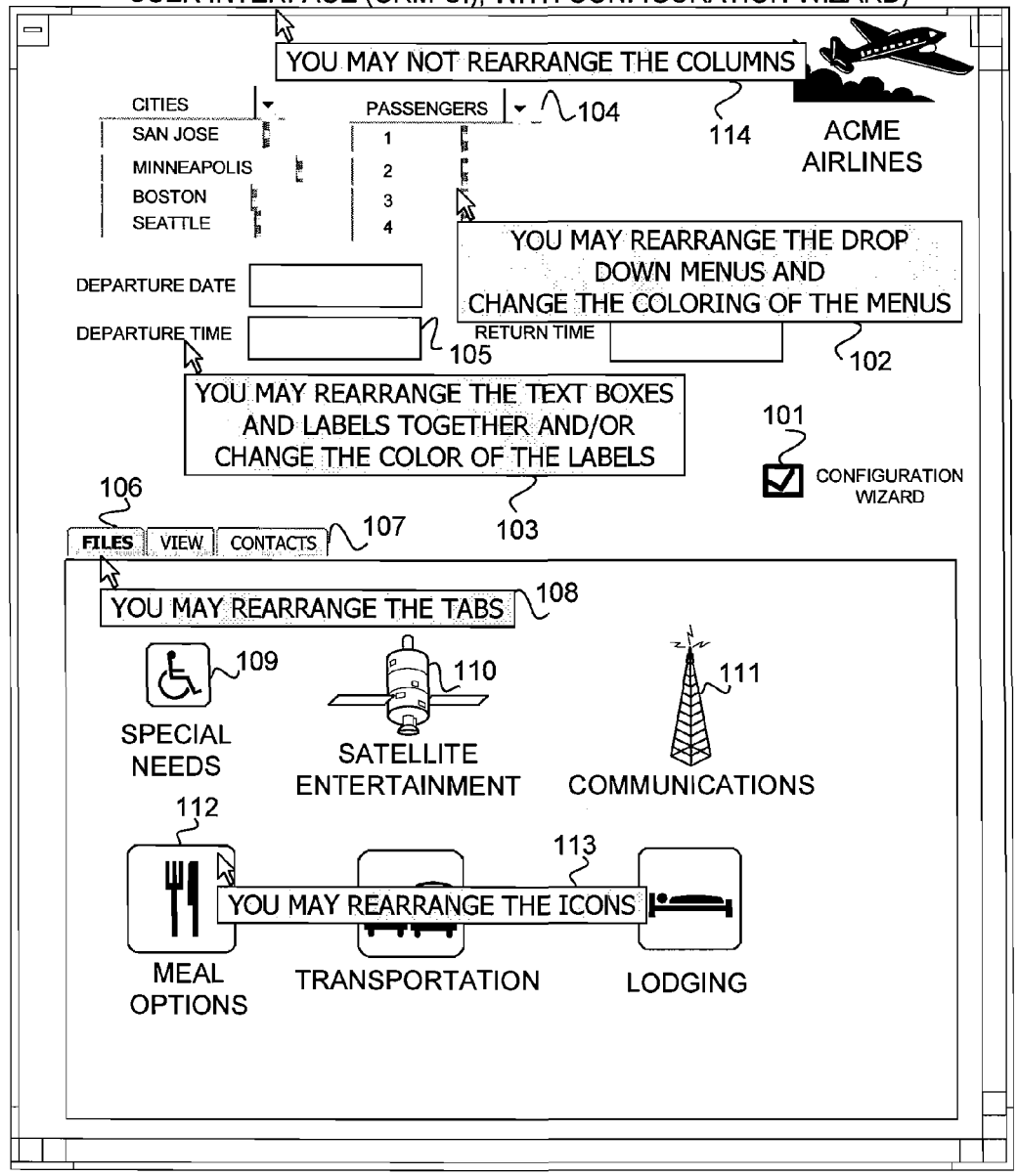
FIG. 1 is a diagram of a UI illustrating a Customer Relation Management User Interface (CRM-UI), according to an example embodiment.

In the following description, for purposes of explanation, numerous specific details are set forth in order to provide a thorough understanding of an embodiment of the present invention. It may be evident, however, to one skilled in the art that the present invention will be practiced without these specific details.

The leading digit(s) of reference numbers appearing in the Figures generally corresponds to the Figure number in which that component is first introduced, such that the same reference number is used throughout to refer to a component which appears in multiple Figures. Signals and connections may be referred to by the same reference number or label, and the actual meaning will be clear from its use in the context of the description.

Common to many commercial and enterprise software applications is a one-size-fits-all-approach to the UIs (e.g., GUIs) implemented by these software applications. One benefit of such an approach is that once an end user becomes familiar with using the UI, the end user can be much more efficient in exploiting the benefits (e.g., functionality) associated with the UI. However, many times, a learning curve exists such that the short-term productivity (e.g., a loss of short-term productivity) of the end user is exchanged for the end user becoming familiar with using the UI. A UI tailored to an individual end user's needs may address this problem of a loss of short-term productivity, but the cost of such customization may far outweigh the loss of short-term productivity.

In one embodiment, a system and method is illustrated that allows for a level of customization by an end user, but at the same time preserves the universal functionality common to many commercial and enterprise software applications. In allowing a level of customization by an end user, it is the end user (e.g., the business) that drives the layout of an interface and it respective objects and widgets, and not the software vendor or seller. Put another way, rather than forcing the end user to adapt to a UI, the UI can be adapted to the end user's needs. This UI may reflect certain use cases that an end user may encounter, and may be tailored for these use cases. For example, an end user involved in sales may want to have graphs relating to current sales figures always appear in the UI that they are using. And again, an end user involved in making reservations for a particular hotel may always want a table containing room availability information appearing in their UI.

One type of UI is a Customer Relationship Management UI (CRM-UI). In some embodiments, this UI is used to manage customer relationships by, for example, providing a UI that a customer may use to integrate not only functionality (e.g., software) related to their particular business, but also to integrate more ubiquitous forms for functionality (e.g., email clients, database application, and the like). For example, a CRM-UI may be used to automate the management of account data such that account history may be displayed to an end user, or even an account holder, automatically. And again, a CRM-UI may be used to look for trends in an account, including sales trends. Some commercially available CRM-UIs include, for example, the SAP™ CRM utilized in conjunction with SAP's NETWEAVER™ platform.

Some example embodiments may include a UI that allows for a level of customization, while at the same time preserving certain functionality common to many commercial and enterprise software applications. For example, in one example embodiment, a UI to be used by a reservation agent at an airline is illustrated wherein certain objects and widgets (collective referenced as UI elements) are modifiable by an end user, whereas other UI elements are not modifiable by an end user. A reservation agent may be able to change the color and placement of a drop-down menu containing a list of cities to which the airline flies, but the agent may not be able to remove (e.g., delete) this UI element.

In some cases, the level of customization available in such a UI may be limited by the overall functionality possessed by the UI. For example, an end user may only be able to reposition a UI element to the extent that the display logic or business logic will accommodate this repositioning. Where, for example, an end user seeks to reposition (e.g., at the bottom of a web page displaying the CRM-UI) a UI element in the form of a drop-down menu such that the menu cannot be expanded, then such a repositioning may be precluded by the display or business logic.

Further, in some cases, the level of customization may be limited by certain business considerations. For example, many businesses may seek to prevent users from removing UI elements in the form of a Joint Motion Pictures Experts Group (JPEG) images depicting trademarks, trade names, or the like from a UI. Further, some business may wish to restrict an end user from tailoring a CRM-UI in such a way that while supported by the display and/or business logic of the CRM-UI, the business finds the tailored CRM-UI to be contrary to the business's goals.

Example embodiments may include certain functionalities that allow an end user, especially a lay user (e.g., one with little or no formal training in the CRM-UI), to be instructed on the level of customization that may be available to them. This functionality, in some embodiments, may be in the form of a UI element (e.g., a switch, radio button, check box, or some other suitable UI element) that facilitates the activation of a configuration wizard. In one embodiment, this configuration wizard may allow an end user to be prompted with messages regarding the level of customization available to them to modify each UI element appearing as a part of a UI (e.g., a CRM-UI).

Some example embodiments may include a template (e.g., an Adaptation Pattern) that is provided to the end user to enable the end user to generate a completely new UI tailored for his or her specific purposes. This template could reflect an end-user-driven use case that may contain typical settings for an end user's UI. The template may unify many different user interface parts (e.g., UI elements). Further, this template could be used for personalization, administration, configuration, and for business object (e.g., UI element) settings. Moreover, the use of this template may be used to facilitate a reduction in screen complexity. In some embodiments, a screen wizard (e.g., a configuration wizard) maybe used to guide an end user through the process of using one or more of these templates. For example, the interaction with, and design of, the templates may be switched to a wizard activity template (e.g., automatically without extra implementation effort) which allows guidance for the user through the predefined template process.

In some embodiments, a process is implemented whereby the parameters for the level of customization are determined. For example, in some embodiments, a software developer determines the display and business logic to be associated with a particular UI. In the broadest sense, the developer may determine what UI elements and layout elements (e.g., columns, tables, panes, and containers) may be used and associated together. Next, an administrator (e.g., an administrator) may set certain privileges relating to what UI elements may be repositioned, and the manner in which they may be repositioned. Further, the administrator may set certain privileges regarding what colors may be used for a UI element. As previously alluded to, these privileges may be based upon a business's goals and/or policies regarding the tailoring of UIs and the UI elements and layout elements contained therein.

Other features may be apparent from the accompanying drawings and from the detailed description that follows.

An Example UI as a Personalized Tool

FIG. 1 is a diagram of an example UI 100 illustrating a CRM-UI that is capable of being personalized (e.g., the can serve as a personalization tool). Illustrated is a UI containing a number of screen objects or widgets in the form of UI elements that are associated with a number of layout elements. For example, a configuration wizard checkbox 101 is illustrated that allows an end user to receive prompts regarding the extent to which they may configure a particular UI. In some cases, this configuration wizard checkbox 101 may be a checkbox, a radio button, or some other suitable input UI element. Also illustrated are a number of prompts (e.g., 102, 103, 113, and 114). In some embodiments, these prompts are activated by an end user moving a pointer, using an input device such as a mouse, over a particular UI element. Where the pointer comes into contact or close proximity to this UI element, a prompt will appear in the form of a message instructing the end user on the level of customization or personalization that they may engage in with respect to the particular UI element. Prompts may also appear with respect to layout elements. With regard to prompt 102, the end user is prompted that "You may rearrange the drop-down menus and change the coloring of the menus". Further, with regard to prompt 103 an end user is prompted that "You may rearrange the textboxes and labels together and/or change the color of the labels". Similar messages are provided for prompt 108, 113, and 114. In addition to these prompts, various screen objects or widgets in the form of UI elements are provided, such as for example a drop down menu 104, text box 105, tabs 106 and 107, and various icons such as 109-112. In some embodiments, a UI such as UI 100 may be provided to manage certain types of customer relationships. Here, for example, a hypothetical customer called Acme Airlines is provided the UI in the form of UI 100.

Example Templates for Personalizing a UI

In some embodiments, by executing the configuration wizard checkbox 101, the end user will be able to directly modify (e.g., using a drag and drop method in combination with an input device such as a mouse) a UI, and the UI elements and layout elements contained therein, to meet the needs of a particular use case. However, in some embodiments, upon execution of the configuration wizard checkbox 101, an end user will be prompted with one or more templates used to generate a UI that reflects certain use cases that the end user may encounter during the course of performing his or her job. These templates will allow the end user to generate one or more new UIs to accommodate these use cases. In some cases, these various templates may be provided in sequence, or as a part of a sequence, that the end user may follow to generate a particular UI to accommodate a use case. For example, an end user may create a layout element containing the appropriate labeling (e.g., explanation text) using one template, and then use a second template to associate UI elements with this layout element.

Figure 2:
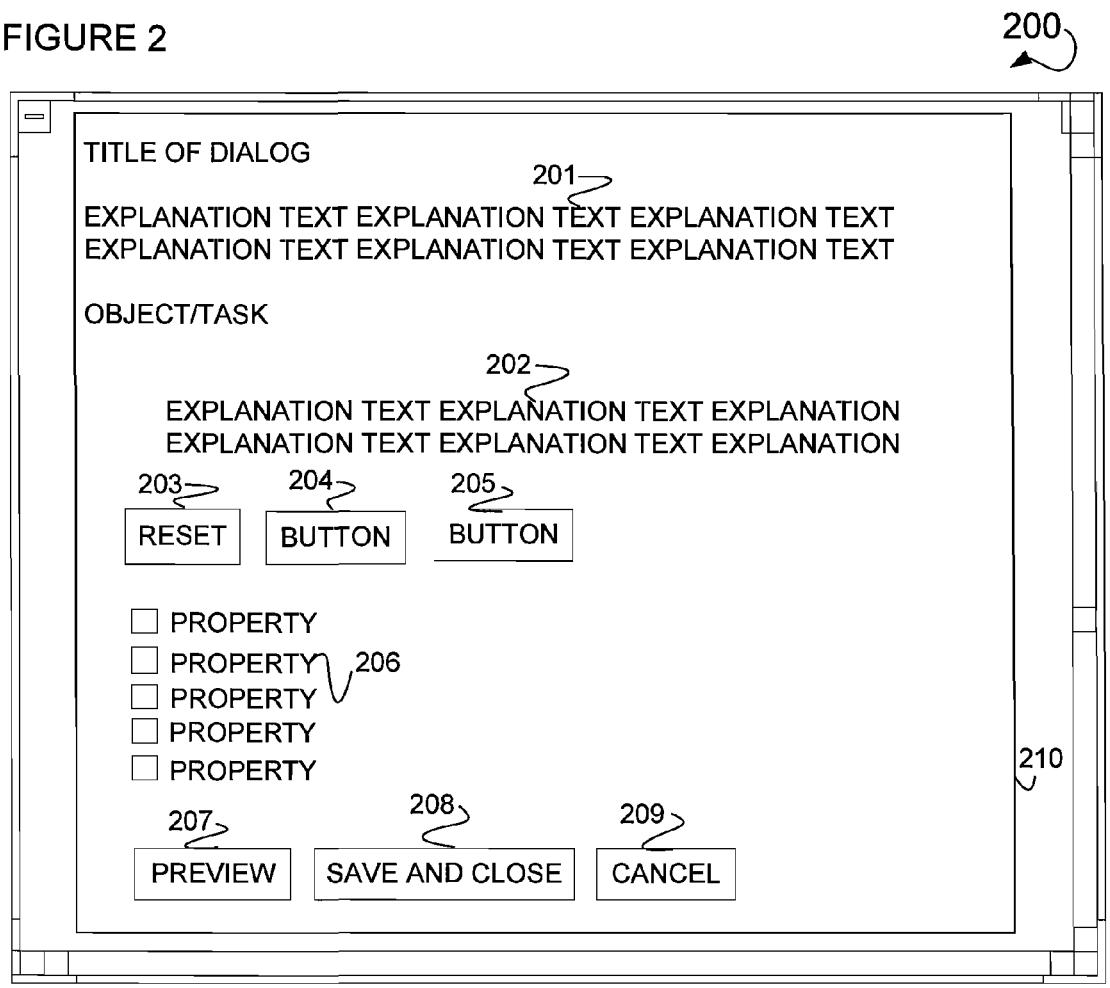
FIG. 2 is a diagram illustrating a template used to generate a UI for a CRM-UI, according to an example embodiment.

FIG. 2 is a diagram illustrating an example template 200 used to personalize a UI such as, for example, a CRM-UI. Illustrated is a field 201 that explains how a UI may be personalized by an end user. This end user may include persons with various skill levels (e.g., beginner, intermediate or advanced) relating to their ability to configure a UI, and may even include an administrator and/or developer. (See generally FIGS. 2-6) A further field 202 is provided that performs a similar explanatory function. In addition to the providing of text explaining certain aspects of a UI, various screen objects and widgets can also be provided and manipulated to be repositioned into various places on the template. For example, various buttons 203 through 205 are provided that may be manipulated. Similarly various checkboxes and textboxes, such as, for example, check boxes 206, are provided, as are additional buttons 207, 208 and 209. In some embodiments these various text fields (e.g., 201-202) and screen objects or widgets (e.g., UI elements) are associated with, for example, a container 210. This container 210 may be a container, in some cases, or may be a pane as is known in the art. As will be more fully described below, these various UI elements (e.g., 203-209) and explanatory text 201-202 may be manipulated to a greater or lesser degree based upon the privilege associated with these UI elements and explanatory text.

Figure 3:
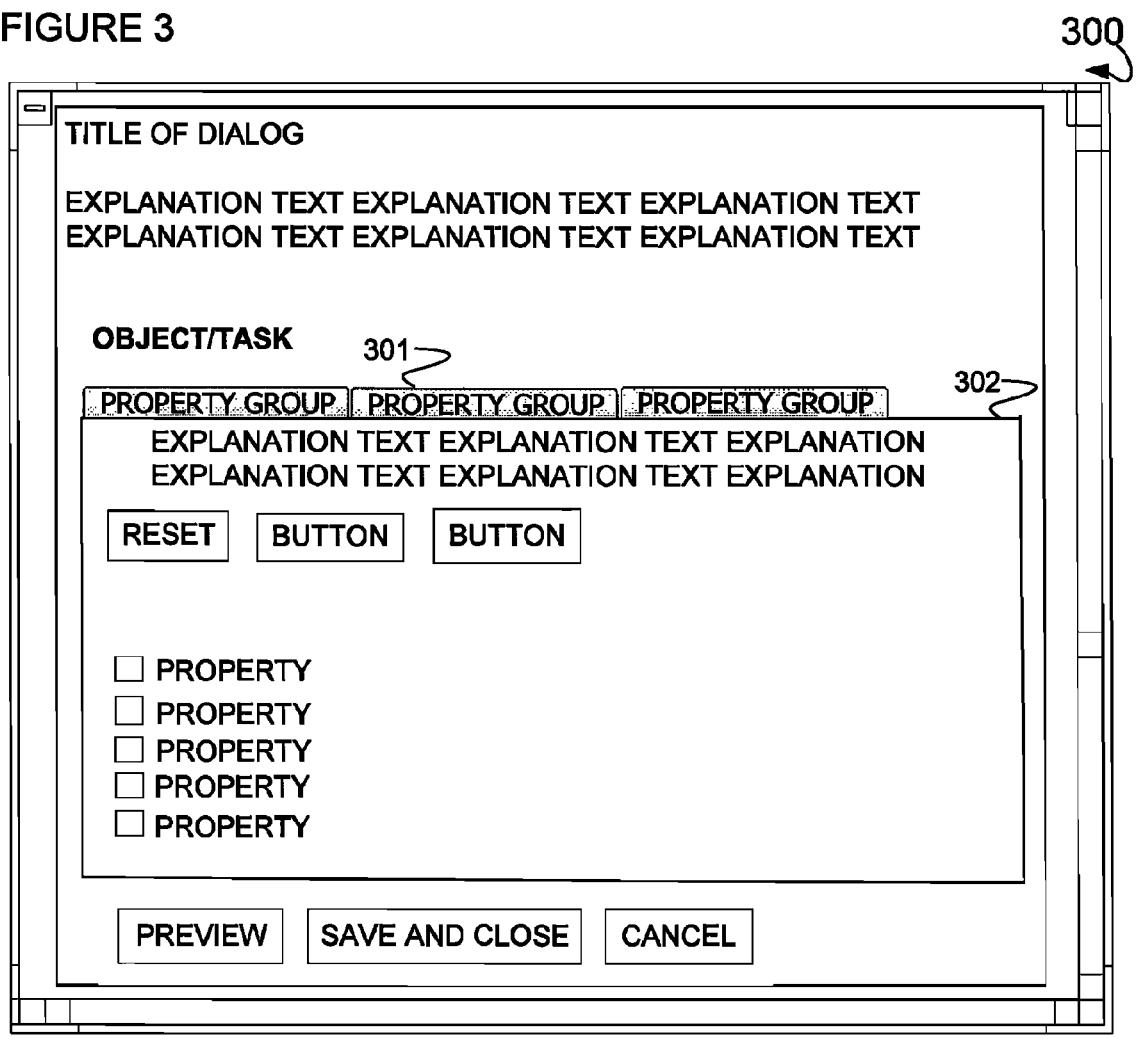
FIG. 3 is a diagram illustrating a template used to generate a UI that includes UI elements in the form of tabs that can be used to personalize a UI such as a CRM-UI, according to an example embodiment.

FIG. 3 is a diagram of an example template 300 illustrating a template that can be used to personalize a UI such as a CRM-UI. Illustrated is a UI element in the form of a tab 301 that is used to manipulate a pane 302. The pane 302 contains various text fields and UI elements such as buttons and checkboxes. As will be more fully described below, the ability to manipulate these various UI elements and even a layout element such as a pane 302, may depend upon the privileges associated with manipulating each of these UI and layout elements.

Figure 4:
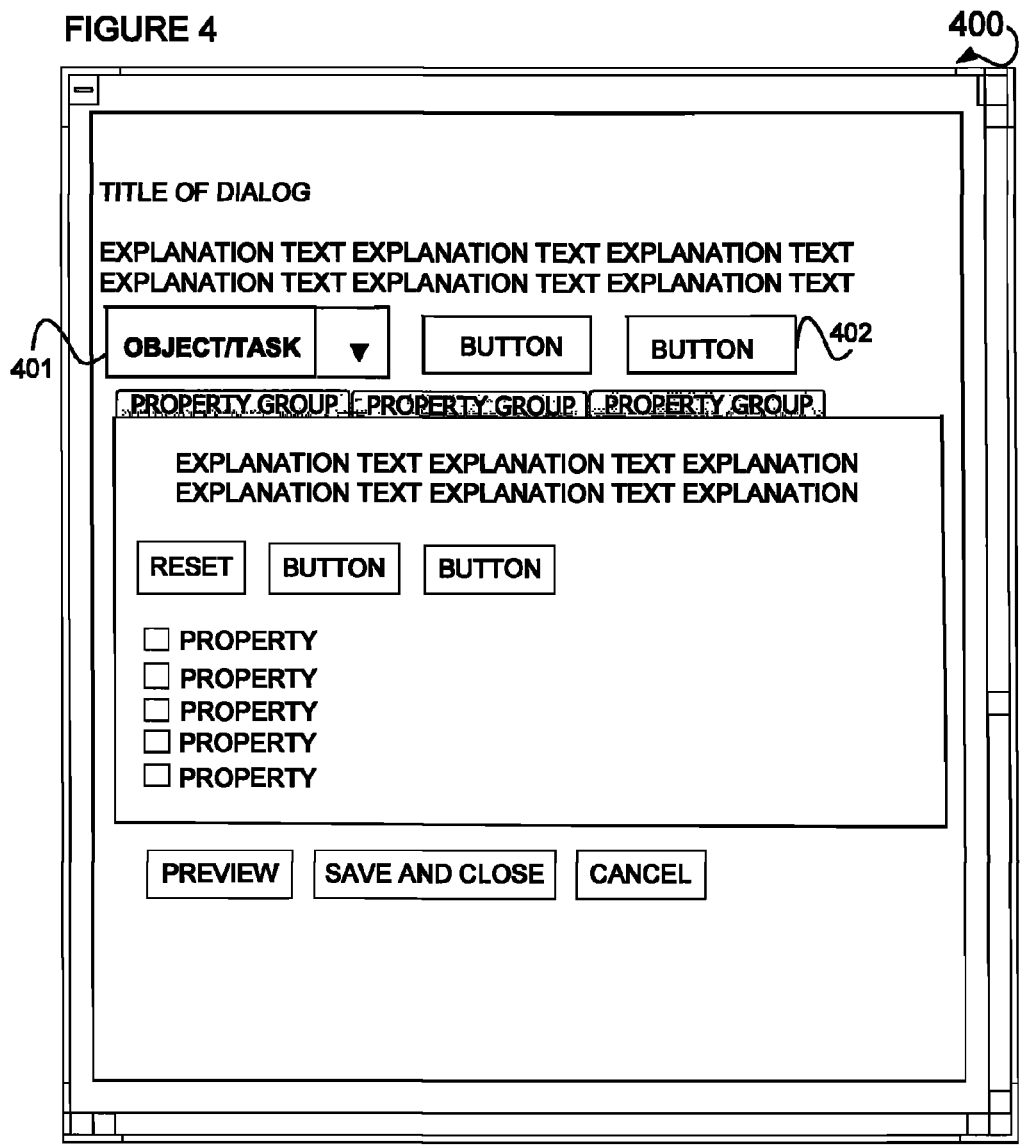
FIG. 4 is a diagram illustrating a template used to generate a UI that includes a UI element in the form of a drop-down menu for a UI such as a CRM-UI, according to an example embodiment.

FIG. 4 is a diagram of an example template 400 illustrating a template used to personalize a UI such as a CRM-UI. Illustrated are a drop-down menu 401 and a button 402. This drop-down menu 401 and button 402 are one of many types of UI elements that may be used in a template such as the presently illustrated template 400 or the previously illustrated templates 200 and 300. As will be more fully described below, the ability to manipulate these various UI elements and even a layout element such as drop-down menu 401 and button 402 may depend upon the privileges associated with manipulating each of these UI elements.

Figure 5:
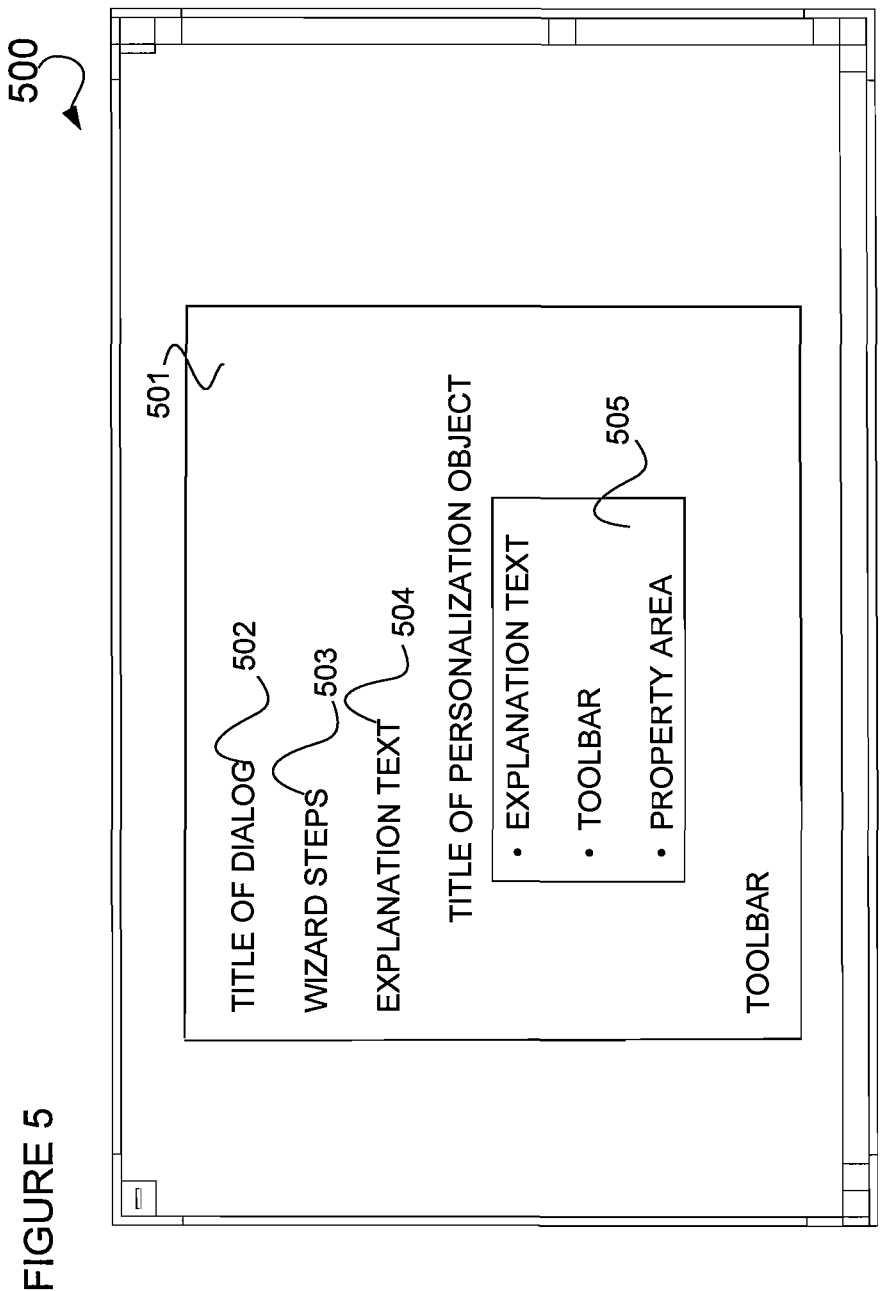
FIG. 5 is a diagram illustrating a template used to generate a UI element for use with a UI such as a CRM-UI, according to an example embodiment.

FIG. 5 is a diagram illustrating a template 500 used to personalize a UI element in, for example, a CRM-UI. Illustrated is a container or frame 501 containing a title of dialogue field 502, a wizard steps field 503, an explanation text field 504, and an object definitional field 505. In some cases, a title of dialogue field 502 will allow for an end user to see the title of a UI element. Additionally, a wizard step value, such as wizard steps value 503, may be additionally associated with the frame 501. This wizard step value 503 may allow a UI element and/or layout element to be associated with a configuration sequence, wherein various steps (e.g., instructions) are followed to configure a UI to accommodate a use case. More to the point, this frame 501 may be associated with a particular step in the executed configuration wizard option, as previously illustrated by the configuration wizard checkbox 101 of FIG. 1. Further, a field 504 providing explanation text may be used to instruct an end user as to how to use this particular frame 501 during the process of the customization of a UI (e.g., CRM-UI). Moreover, an object definitional field 505 may allow an end user to personalize a particular object appearing in the pane or frame 501. This personalization may take the form of, for example, providing explanation text for this personalization object (e.g., UI element). Additionally, an end user may be able to associate this personalization object with a tool bar, and provide different properties for this personalization object. Alternatively, or in addition, an end user may be able to provide a description for the various properties associated with a personalization object (e.g., a UI element) that he or she has created. As will be more fully described below, the ability to manipulate a frame 501 may depend upon the privileges associated with manipulating each of these objects.

Figure 6:
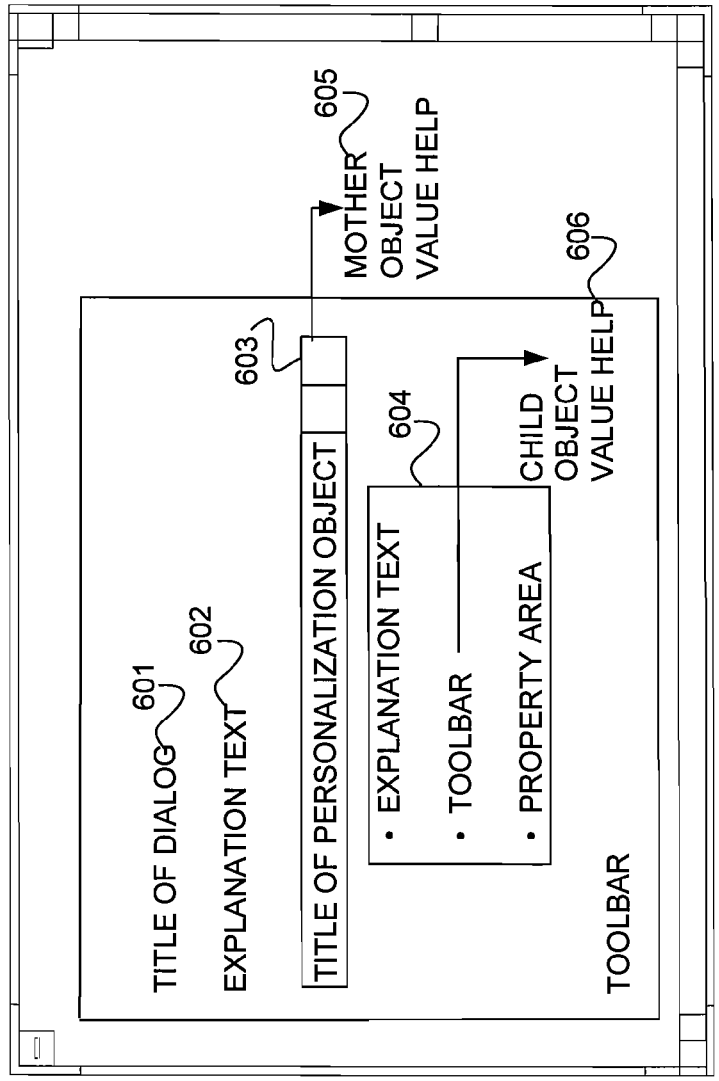
FIG. 6 is a diagram illustrating a template used to associate a first UI element with a second UI element in the form of a parent-child relationship, according to an example embodiment.

FIG. 6 is a diagram of an example template 600 illustrating a template used to associate a UI element with another UI element in the form of a parent-child relationship. Illustrated is a title of dialogue field 601, wherein an end user may review a title for a particular UI element (e.g., an object). Further, an end user is provided with a field 602 by which they can see explanation text. This explanation text may be used to instruct an end user as to the relationship between one particular UI element and another particular UI element. Additionally, a field 603 is illustrated that reflects a title generated for a particular UI element (e.g., an object) by, for example, a developer, administrator, or end user. In some cases, this object will be a parent (e.g., a mother) object whereby through accessing this object related child objects may also be able to be accessed. These child objects may only be able to be accessed by first accessing the parent object. Moreover, a field 604 is illustrated that allows a developer, administrator, or end user to provide explanatory text, and to associate a particular child object with a tool bar, and/or to allow this developer or administrator to generate a definition relating to a particular property of a child object. Further, in some cases a help popup message 605 (e.g., a prompt) may exist for a mother object, and a help popup message 606 (e.g., a prompt) may exist for a child object. These help popup messages (e.g., 605 and 606) may provide a developer, administrator, or even an end user with some guidance as to the privileges associated with an object. As will be illustrated more fully below, in some cases, an end user may be provided certain privileges whereby they may or may not be able to access a child object associated with a particular parent object.

A Model for Generating a Personalized UI

Figure 7:
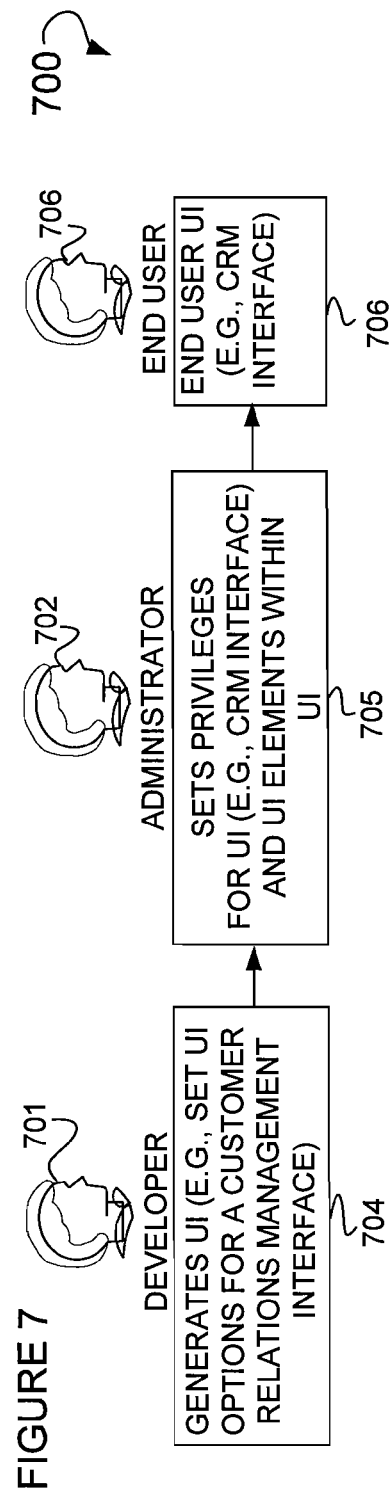
FIG. 7 is a block diagram illustrating the roles of various individuals (e.g., developers, administrators, and end users) in the generation of a UI such as a CRM-UI, according to an example embodiment.

FIG. 7 is a block diagram 700 illustrating the roles of various individuals (e.g., developers, administrators, and end users) in the generation of a UI such as a CRM-UI. As illustrated elsewhere, prior to a user, such as an end user 706, being able to utilize one of the previously illustrated templates (e.g., template 200-template 600), the display logic and business logic associated with this template and/or CRM-UI may be generated. Once this logic is generated, certain privileges may be created that are associated with defining the scope of the ability of, for example, end user 706 to manipulate the various UI elements on a particular template (e.g., template 200-template 600), or a CRM-UI (e.g., 100). For example, a developer 701 may generate a UI. This generation of a UI may be through, for example, using certain principles of declarative programming, or even, in some instances, imperative programming. (See block 704.) Once the UI is generated, an administrator 702 may set certain privileges limiting the ability of, for example, an end user 706 to modify or otherwise change a template and/or a resulting UI (e.g., CRM-UI). These privileges may also be set by the developer 701. Once these privileges are set (e.g., 705), then the previously referenced end user 706 will be free to modify or personalize a UI and/or CRM-UI (see e.g., end user 706).

A System for Implementing a Model for Generating a Personalized UI

Figure 8:
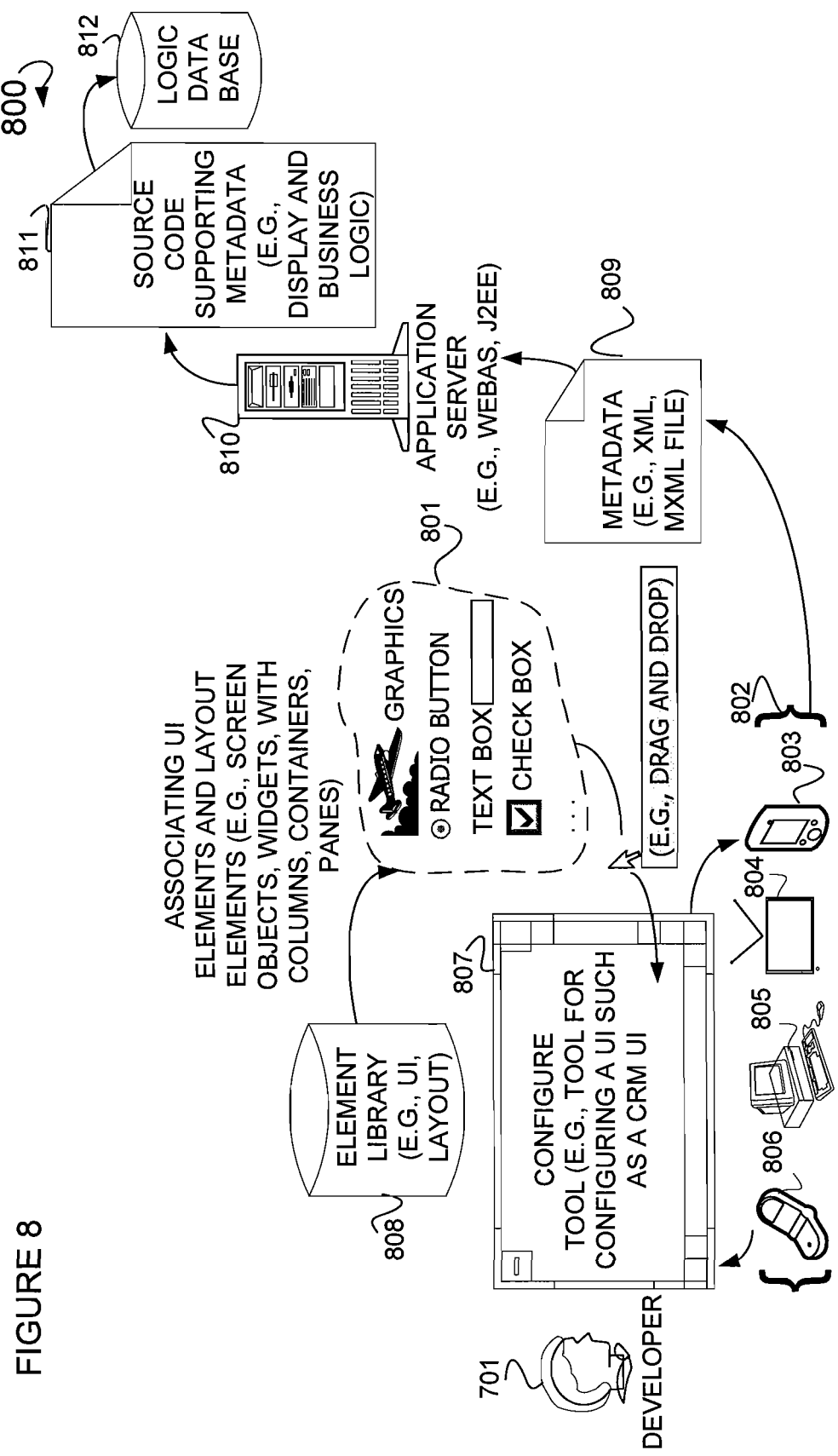
FIG. 8 is a diagram of a system illustrating the generation of a UI by a developer using a configuration tool, according to an example embodiment.

FIG. 8 is a diagram of an example system 800 illustrating the generation of a UI by a developer 701. Illustrated is developer 701 who, utilizing a configuration tool 807, generates a UI, including the supporting display logic and business logic associated with this UI. For example, a developer 701 may utilize one or more devices 802 upon which may reside this configuration tool 807. Specifically, a developer may use a Personal Digital Assistant (PDA) 803, a television 804, a computer system 805, or even a cell phone 806 as a platform upon which to execute a configuration tool. In some embodiments, various principles of declarative programming may be used whereby the developer 701 may associate a UI element with a layout element (e.g., associate a screen object or widget with a column) through some type of drag and drop method. Once the configuration tool 807 is utilized to associate a UI element or layout element, metadata 809 is generated (e.g., in the form of an eXtensible Markup Language (XML), or Multimedia eXtensible Markup Language (MXML) file 809). This metadata 809 may be provided to an application server 810. In some cases, this application server 810 may be a WEBAS™ based application server, or, for example, a J2EE™ based application server. Once the metadata 809 is provided to the application server 810, a source code file 811 containing display logic and business logic is generated, and stored into a logic database 812 for a subsequent use.

Figure 9:
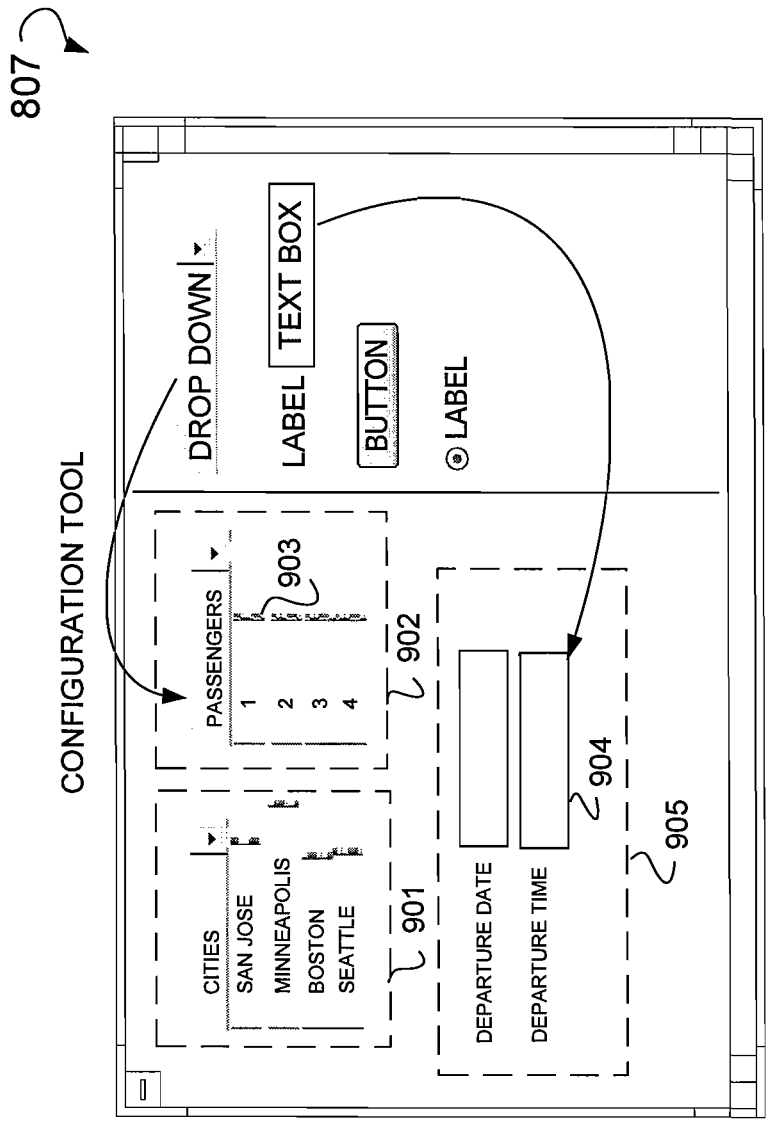
FIG. 9 is a diagram of a configuration tool illustrating the association of various UI and layout elements, according to an example embodiment.

FIG. 9 is a diagram of an example configuration tool 807 illustrating the association of various UI and layout elements (e.g., 901, 902 and 905). For example, associated with layout element 901 (e.g., a column), is a drop-down menu. Similarly, associated with the layout element 902 (e.g., a column) is a second drop-down menu 903. Associated with the layout element 905 is a text box 904. This association of UI elements and layout elements may, in some cases, be effectuated through the use of the previously referenced declarative programming regime or principles.

Figure 10:
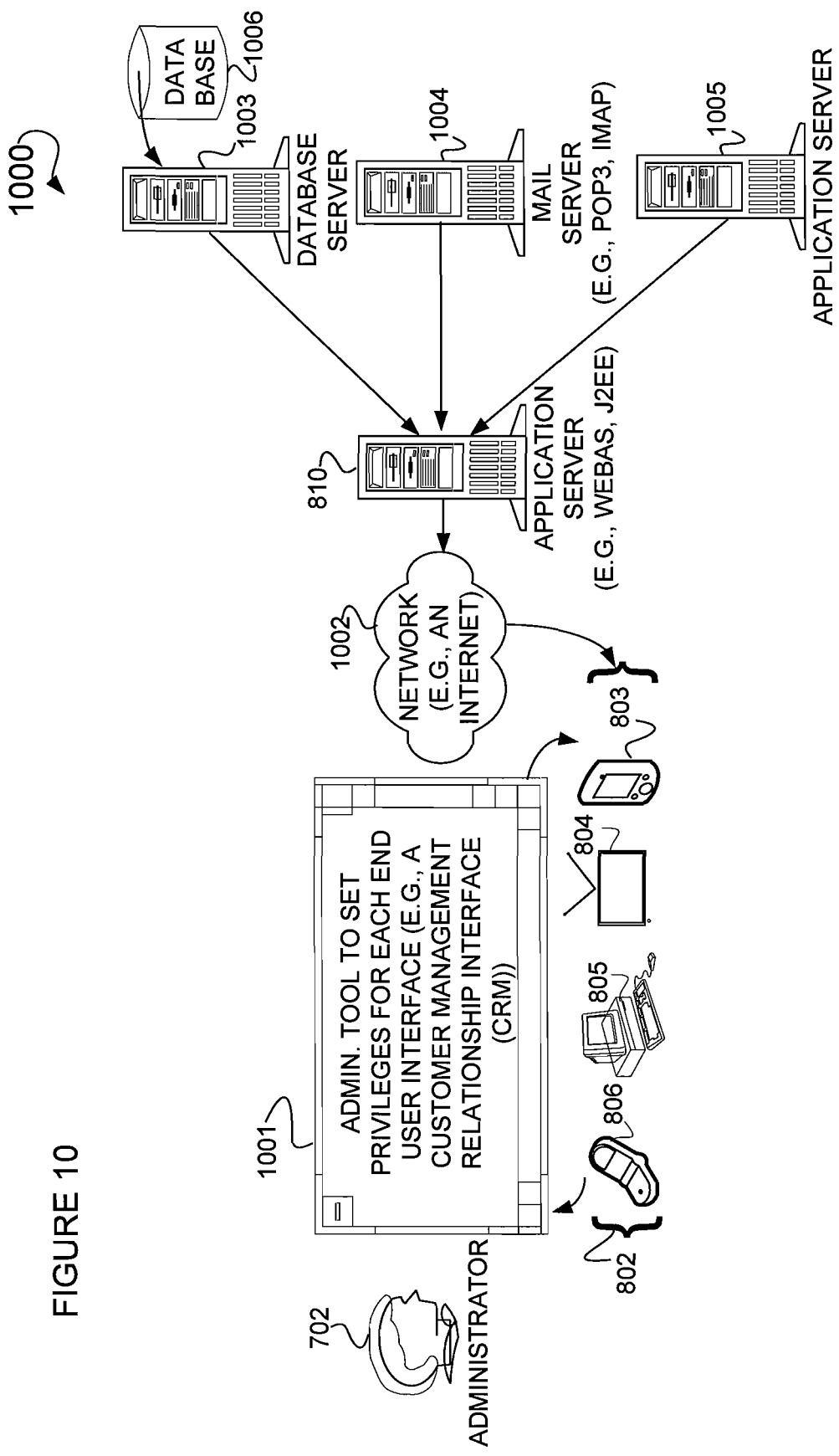
FIG. 10 is a diagram of a system illustrating the use of an administrative tool to set certain privileges relating to an end user's UI (e.g., CRM-UI), according to an example embodiment.

FIG. 10 is a diagram of an example system 1000 illustrating the use of an administrative tool 1001 to set certain privileges relating to an end user's 706 interface (e.g., CRM-UI). Illustrated is an administrator 702 who, utilizing an administrative tool 1001 that resides on one of the previously referenced devices 802, sets certain privileges. In some cases, these privileges are set for a CRM-UI. In certain cases, this administrative tool 1001 may be accessed across a network 1002 such that it resides on the previously referenced application server 810. This application server 810 may, in turn, be operatively coupled to, for example, a database server 1003 and associated database 1006, a mail server 1004, and an application server 1005. In some embodiments, the administrator 702 may remotely access this administrative tool 1001, and set privileges for one or more CRM-UIs.

FIG. 11 is a diagram of an interface for the administrative tool 1001 to set privileges for a UI such as a CRM-UI. Illustrated are a number of UI elements and their associated layout elements. For example, a UI Element #1, referenced herein as 1101, is associated with a layout element in the form of Column #1, referenced herein as 1102. Further, a drop-down menu 104 (e.g., a UI element) is associated with a layout element in the form of Column #2 (e.g., 1103). A further UI Element #2 (e.g., 1104), is illustrated in the form of a Joint Photographic Expert Group (JPEG) image titled "Acme Airlines". Further, various other UI elements and associated layout elements are illustrated, such as, for example, a textbox 105, that is associated with a Column #3 (e.g., 1105), a UI Element #4 (e.g., 1106) that is associated with Column #3 (e.g., 1105), a UI Element #3 (e.g., 1107) in the form of a tab 106, a tab 107, and various other UI elements. Additionally, a field 1108 containing a number of UI elements in the form of checkboxes is also provided, wherein each checkbox has an associated label.

FIG. 12 is a diagram of an interface 1108 in the form of a privilege selection interface for setting privileges for UI elements. Privilege selection interface 1108 contains a number of checkboxes and associated labels, wherein each checkbox is arranged in a column and row format (e.g., as a matrix of check boxes). For example, a UI Element #1 (e.g., 1101) has a number of privileges associated with it including, for example read-only, edit, delete, reposition, and guide available. Here, a checkbox 1201 has been selected for read-only, whereby UI Element #1 (e.g., 1101) may only be read and may not be edited, deleted, repositioned, or a guide made available (e.g., configuration wizard information such as is illustrated in 102, 103, 113, or 114). In contrast to UI Element #1 (e.g., 1101), UI Element #2 (e.g., 1104) has a number of privileges that have been selected. An end user 706 may edit this UI element (see e.g., 1202), they may delete this UI Element #2 (see e.g., 1203), they may reposition this UI Element #2 (see e.g., 1204), and/or they may receive information through a configuration wizard prompt (see e.g., 1205). Put another way, in contrast UI Element #1, it is the administrator 702 who has selected the edit, delete, reposition, and guide available privileges for UI Element #2. With regard to UI Element #5, the repositioning checkbox 1206 has been selected for this UI element. Further, with regard to UI Element #6, the editing privilege has been selected for this UI element (e.g., 1207). Here, UI elements in the form of checkboxes have been used to allow an administrator 702 to select various privileges associated with the UI elements associated with these checkboxes. Clearly, in some embodiments, some other type of UI element may be utilized to perform the same function, such as for example, a radio button, or other suitable UI element.

Figure 13:
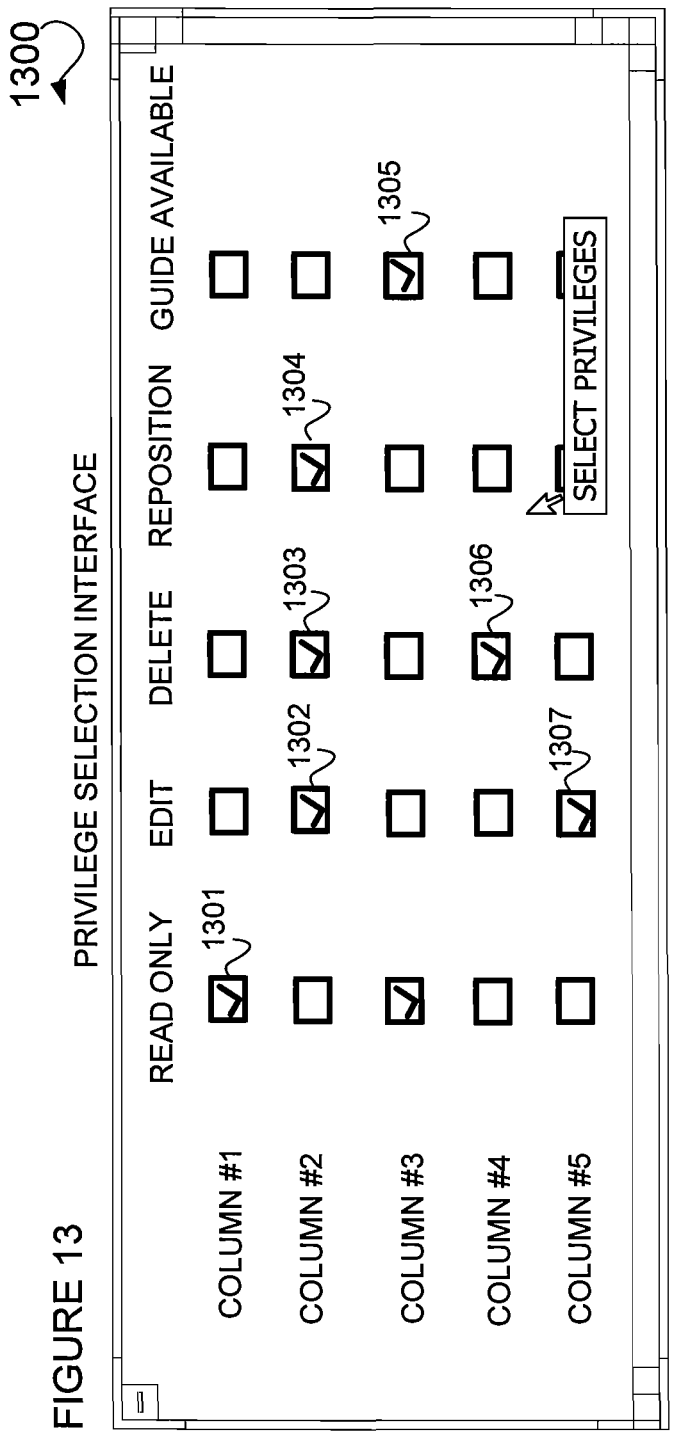
FIG. 13 is a diagram of a privilege selection interface used to set privileges for various layout elements, according to an example embodiment.

FIG. 13 is a diagram of an example privilege selection interface 1300 used to set privileges for various layout elements. Illustrated is a reference to a Column #1 (e.g., 1102) containing a number of privileges associated with it. These privileges include, for example, a read-only privilege, an edit privilege, a delete privilege, a reposition privilege, and a guide available privilege. Here, a read-only privilege 1301 has been selected for the Column #1 through a checkbox. In contrast, Column #2 (e.g., 1103) has a number of privileges that have been selected to be associated with it. For example, with regard to Column #2 (e.g., as it exists in a UI), an end user 706 may edit this column as denoted by 1302, may delete this column as denoted by the delete privilege 1303, or may reposition this Column #2 as denoted by the repositioning checkbox 1304 which has been selected. Additionally, various privileges have been selected for Column #3 (e.g., 1105), such as the selection of a guide available privilege 1305. Also illustrated, is a delete privilege 1306 that has been selected for a Column #4. Further, Column #5 has an edit privilege 1307 which has been selected for it. As previously illustrated, with regard to the privilege selection interface 1108, and the associated UI elements contained therein, an administrator 702 may select these various layout elements to have various privileges associated with them (e.g., read-only, edit, delete, reposition, and/or guide available).

Figure 14:
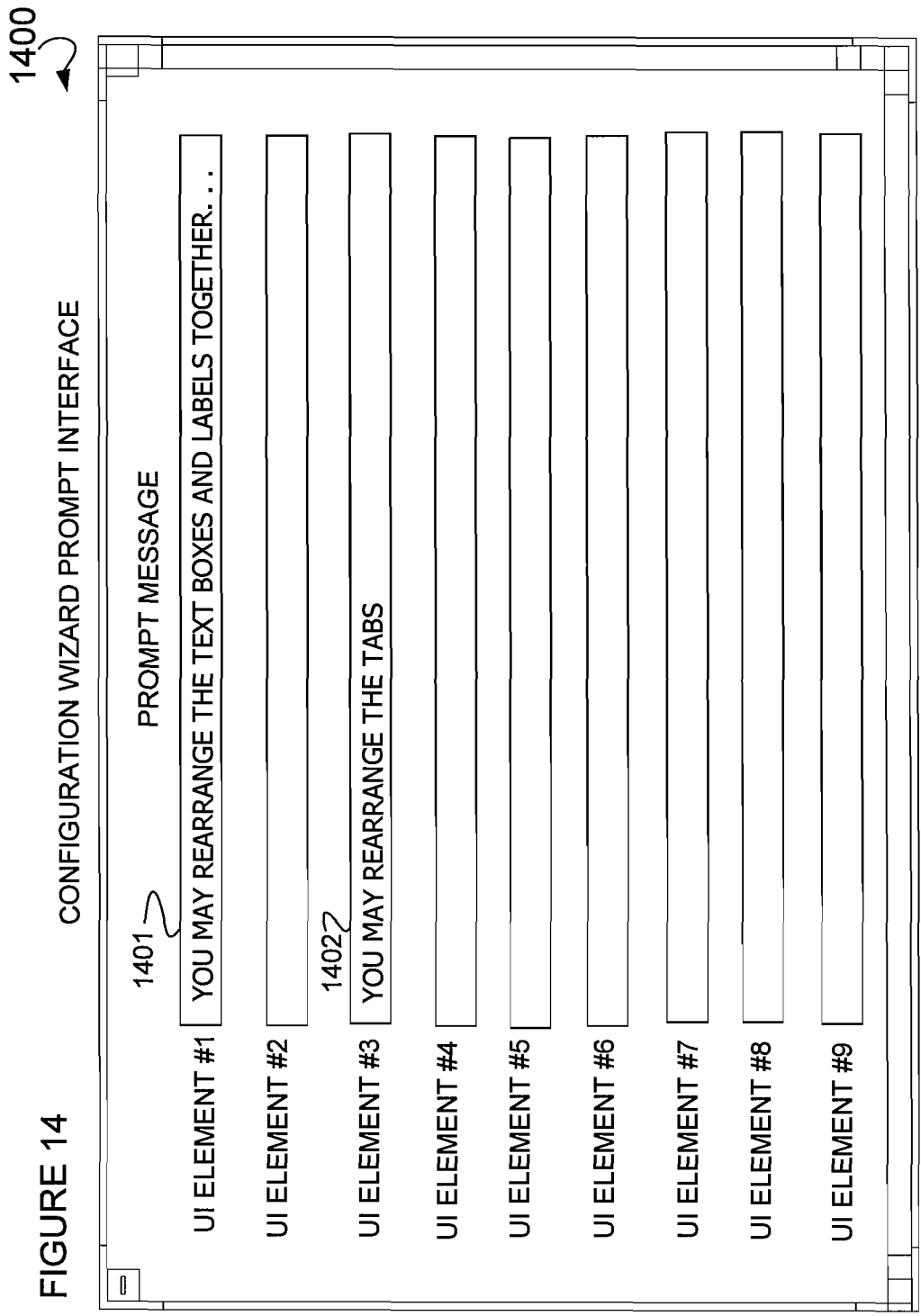
FIG. 14 is a diagram of a configuration guide (e.g., a wizard) prompt interface for entering message prompts for an end user relating to privileges available for a UI element and/or layout element, according to an example embodiment.

FIG. 14 is a diagram of an example UI 1400 in the form of a configuration wizard prompt interface. Illustrated is a textbox 1401 containing a prompt message that is to be associated with a UI Element #1. Here the message states "You may rearrange the textboxes and labels together and/or change the color of the labels". This message is the same message that is previously illustrated as prompt 103. Further a second prompt message is provided as input for textbox 1402 and is further associated with UI Element #3. Here the message states "You may rearrange the tabs" and is the same prompt message that is associated with prompt 108 which has been previously illustrated. Further illustrated here are a number of other textboxes and their associated UI elements.

Figure 15:
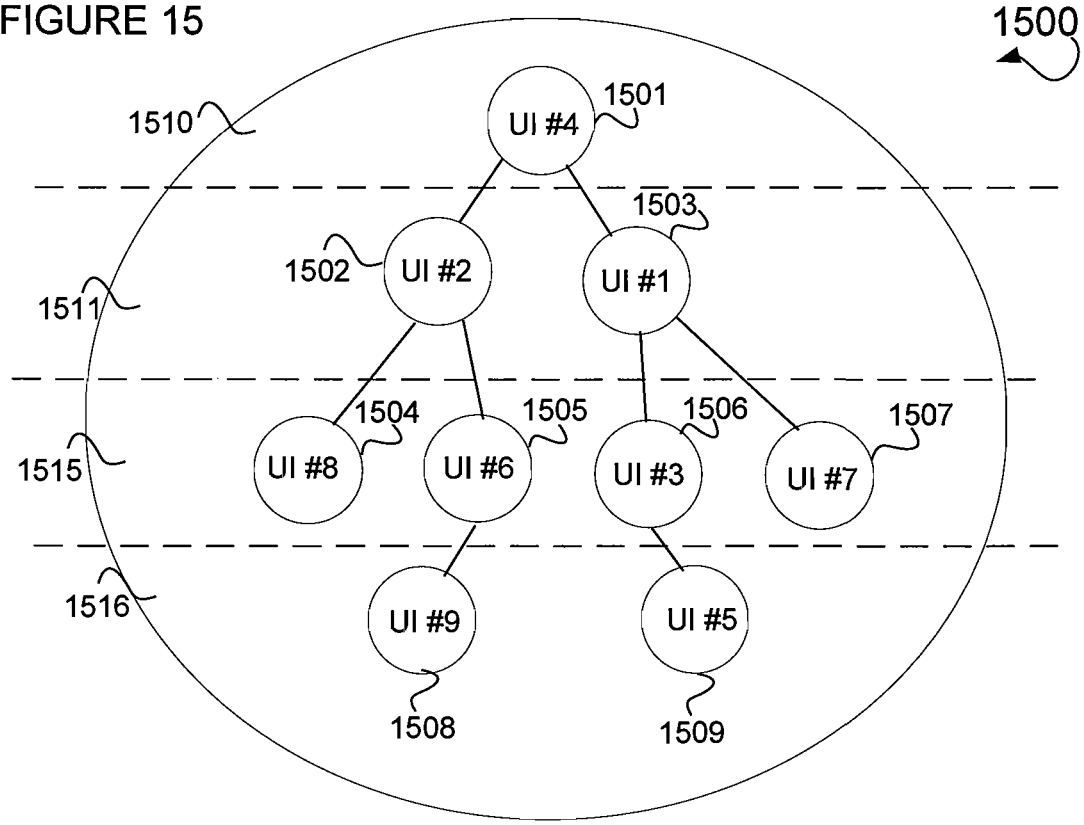
FIG. 15 is a diagram of a network in the form of a tree wherein each node of the tree represents a UI, according to an example embodiment.

FIG. 15 is a diagram of an example network 1500 in the form of a tree wherein each node of the tree represents a user interface. Illustrated is a root node 1501 in the form of a UI #4. This UI #4 has two child nodes 1502 and 1503 (e.g., UI #2 and UI #1 respectively). These child nodes 1502 and 1503 have further child nodes in the form of 1504 (e.g., UI #8), 1505 (e.g., UI #6), 1506 (e.g., UI #3), and child node 1507 (e.g., UI #7). Of these various child nodes (e.g., 1504-1507), child node 1505 has a further child node 1508 (e.g., UI #9), and child node 1506 has a further child node 1509 (e.g., UI #5). Further illustrated are various levels associated with these various UI elements that closely correspond to the depth of this network or tree 1500. At the highest level is a level 1510 wherein the root node 1501 resides. Next, at the second level, is a level 1511 wherein nodes 1502 and 1503 reside. Further, a level 1515 is illustrated wherein nodes 1504 through 1507 reside. Additionally, a level 1516 is illustrated, wherein nodes 1508 and 1509 reside. In some cases, a developer 701 or an administrator 702 may give a user, such as an administrator 702 or an end user 706, privileges to access one or more of these levels (e.g., 1510-1516). These privileges may be based upon certain types of considerations such as administrator 702's and end users 706's position within a company, their responsibilities within that company, or some other suitable considerations. In short, through organizing these various UIs in some type of hierarchical data structure, a developer 701 or an administrator 702 may be able to limit the access of an end user 706.

Figure 16:
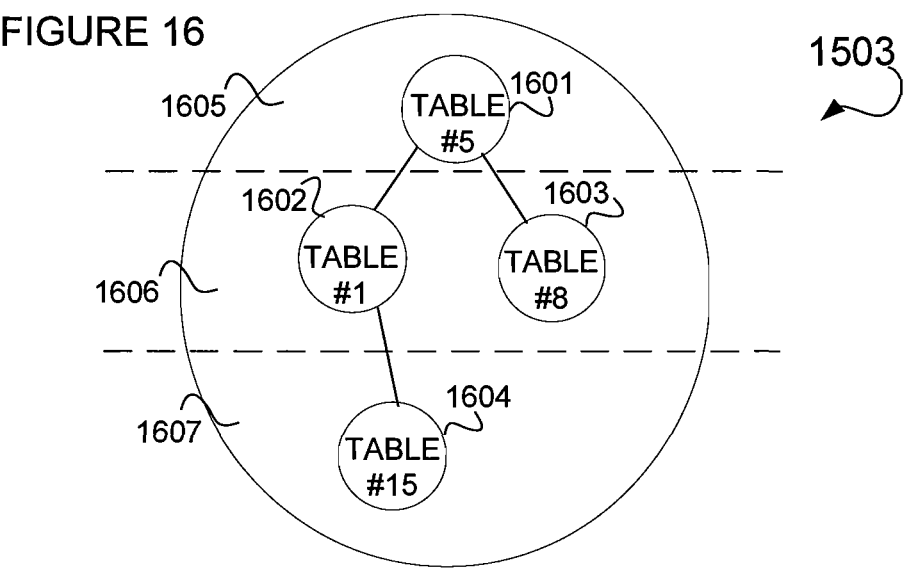
FIG. 16 is a diagram of a UI node, and its associated sub-nodes (e.g., layout elements in the form of tables), according to an example embodiment.

FIG. 16 is a diagram of an example node 1503 and its associated sub-nodes, each illustrating a layout element in the form of a table. Node 1503 contains a number of sub-nodes organized in a tree like data structure. For example, a root node 1601, in the form of a layout element such as Table #5, is illustrated. This root node 1601 has two child nodes in the form of 1602 and 1603 (e.g., Table #1 and Table #8). Child node 1602 has a further child node 1604 (e.g., Table #15). As with the network 1500, this node 1503, and the sub-tree associated with it, contains a number of levels that closely reflect the depth of this tree data structure. For example, the root node 1601 occupies a level 1605. Next, the child nodes 1602 and 1603 occupy a level 1606. Further, the child node 1604 occupies a level or depth 1607. As with the tree 1500, one purpose of these various levels is to allow a user, such as end user 706, to have privileges to access these various levels, or, put another way, the administrator 702 may set privileges to access one or more of these levels. For example, an end user 706 may be limited to being able to access only node 1604, 1603 and 1602 (e.g., levels 1606 and 1607). This access may be in the form of, for example, being able to delete, edit, or reposition these various layout elements.

Figure 17:
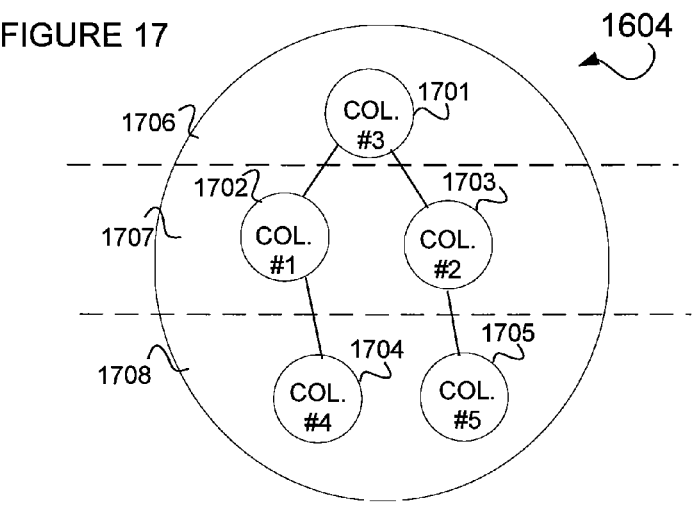
FIG. 17 is a diagram of a layout node, and its associated sub-tree, according to an example embodiment.

FIG. 17 is a diagram of an example node 1604 and its associated sub-tree. Illustrated is a root node 1701 that provides the starting point for a sub-tree associated with the previously illustrated node 1604. This root node 1701 represents a Col. #3. This Col. #3 has two child nodes in the form of 1702 and 1703 (e.g., Col. #1 and Col. #2). Associated with child node 1702 is a further child node 1704 in the form of a Col. #4. Further, associated with node 1703 (e.g., Col. #2) is a further node 1705 in the form of a Col. #5. As with the previously illustrated trees (see e.g., FIGS. 15 and 16), this sub-tree has a number of levels that closely reflect the depth of this sub-tree. For example, a level 1708 contains nodes 1704 and 1705, a further level 1707 contains nodes of 1702 and 1703, and a further the level 1706 contains node 1701. As previously illustrated, the purpose for organizing these various sub-trees in to a number of levels (e.g., in the form of a tree data structure) is to allow an administrator 702 to associate certain privileges with each one of these levels whereby an end user, such as end user 706, may be able only to access one or more of these levels, and hence one or more of the nodes associated with each level.

Figure 18:
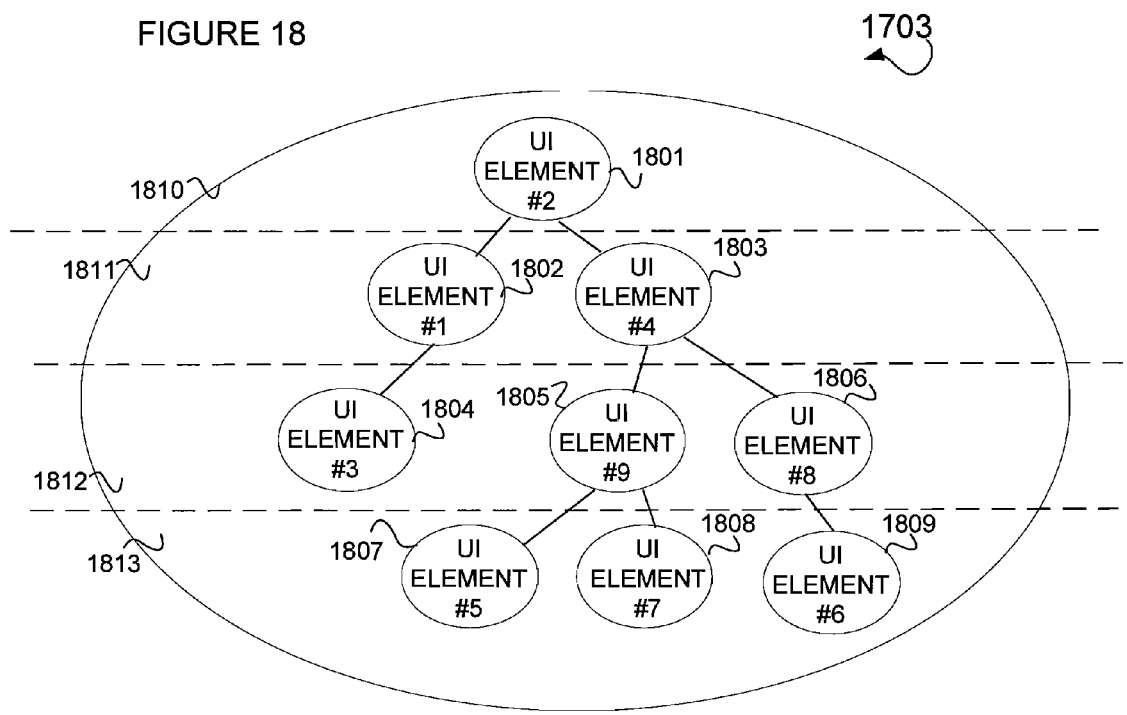
FIG. 18 is a diagram of a layout node, and its associated sub-trees in the form of UI elements, according to an example embodiment.

FIG. 18 is a diagram of an example node 1703 and its associated sub-trees. Illustrated is a sub-tree containing a root node 1801 (e.g., UI element #2). This root node 1801 has two child nodes in the form of child node 1802 and 1803 (e.g., UI element #1 and UI element #4). Associated with node 1802 is a child node 1804 (e.g., UI element #3). Further, associated with node 1803 is nodes 1805 and 1806 (e.g., UI element #9 and UI element #8). Next, associated with node 1805 is child nodes 1807 and 1808 (e.g., UI element #5 and UI element #7). Additionally, associated with node 1806 is a node 1809 that is a child node of 1806, and is illustrated as UI element #6. As previously illustrated with regard to nodes 1503 and 1604, the sub-tree data structure associated with the node 1703 contains a number of levels that roughly corresponds to the depth of this sub-tree. Each one of the levels that make up this sub-tree provided for certain levels of privilege or access available to an end user such as end user 706. For example, a level 1813 contains nodes 1807 through 1809, a level 1812 contains nodes 1804 through 1806, a level 1811 contains nodes 1802 and 1803, and level 1810 contain a root node 1801. As previously illustrated, the purpose of arranging these various nodes in a hierarchal tree data structure is to allow an administrator, such as administrator 702, to set certain privileges associated with each one of these levels such that the end user 706 may only be able to access certain nodes at certain levels of this sub-tree that is used to make up node 1703. For example, an end user 706 may be only able to access level 1812 and nodes 1804 through 1806

Figure 19:
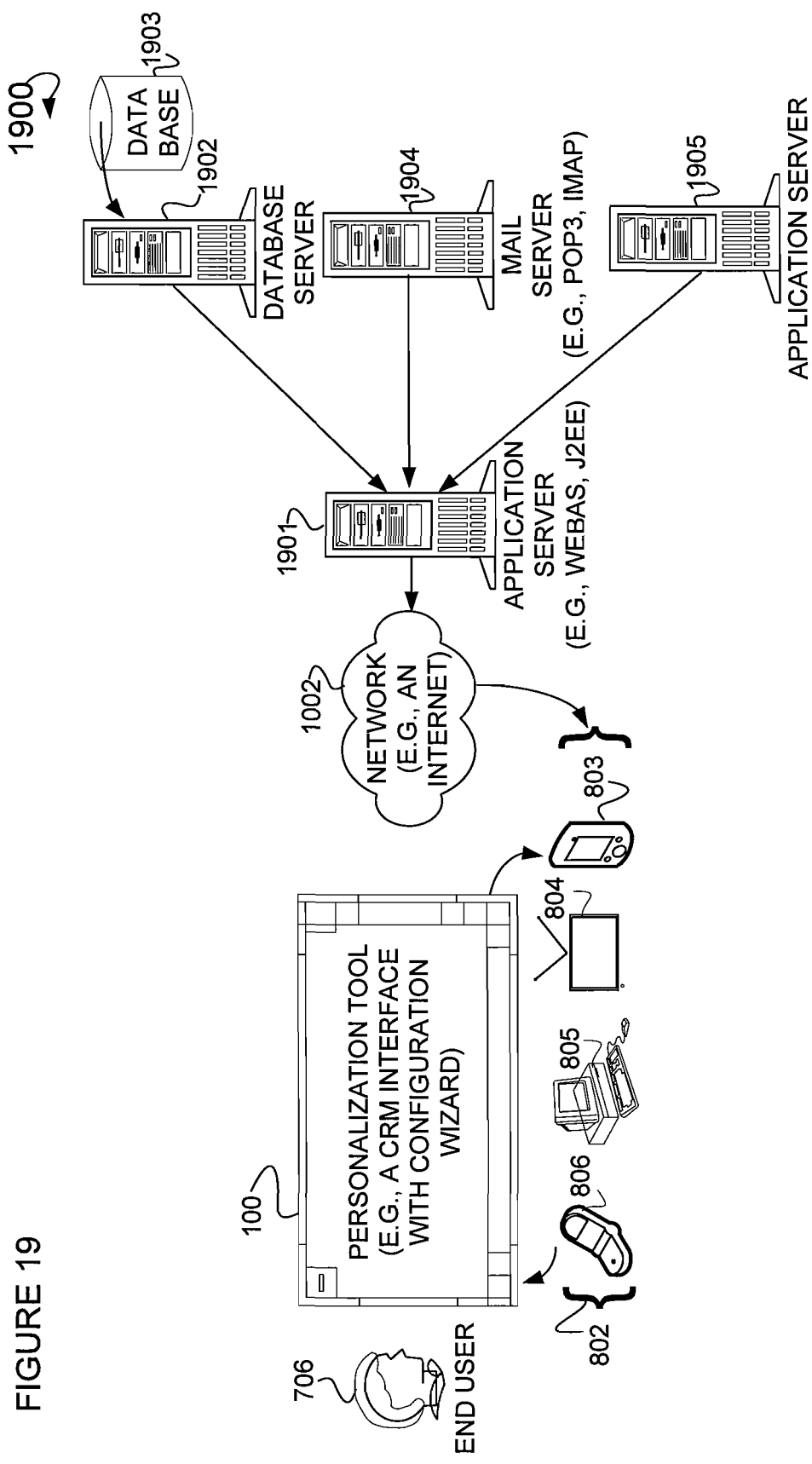
FIG. 19 is a diagram of a system illustrating the use of a personalization tool (e.g., a UI) by an end user to personalize a UI such as a CRM-UI, according to an example embodiment.

FIG. 19 is a diagram of an example system 1900 illustrating the use of a UI 100 by an end user 706 to personalize a UI such as, for example, a CRM-UI. Illustrated is an end user 706 utilizing the UI 100 residing on any one of a number of devices 802. In using this UI 100, the end user 706 may create a customized UI wherein this customized UI may be stored on an application server 1901 and served up by this application server 1901 across a network 1002. In some cases, this application server 1901 may be, for example, a WEBAS™ or J2EE™ application server. Operatively coupled to this application server 1901 may be, for example, a database server 1902 and its associated database 1903, a mail server 1904, and/or an application server 1905. In some cases, an end user 706 may decide to personalize the particular UI that he or she may be using. As previously illustrated, this personalization may take the form of, for example, repositioning various layout or UI elements, changing the color of these UI elements, or executing some other privilege that has been provided to them by an administrator 702. In many cases this personalization may be effectuated to allow the end user 706 to more easily utilize a particular UI (e.g., CRM-UI) for the purposes of allowing him or her to more efficiently perform his or her job, or for some other suitable purpose.

Figure 20:
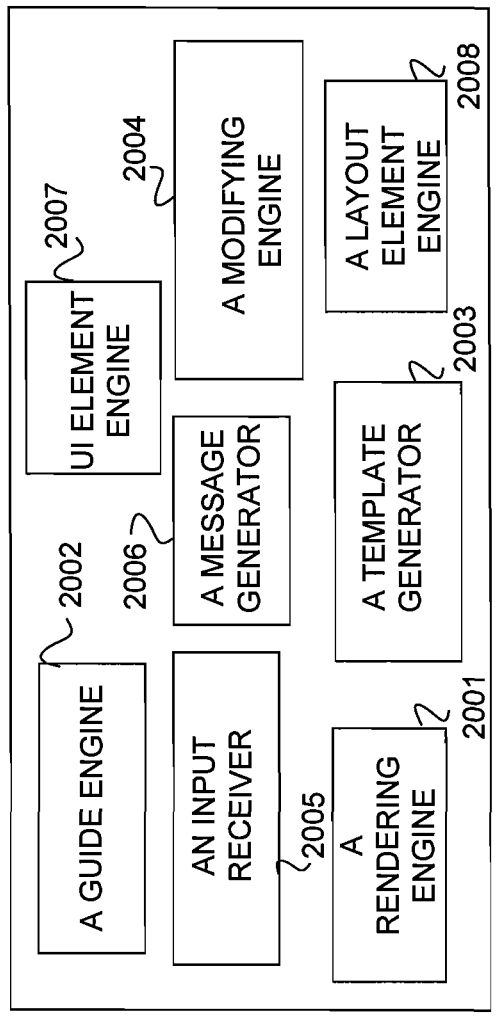
FIG. 20 is a block diagram of one or more devices upon which a configuration tool, administration tool, or personalization tool may reside, according to an example embodiment.

FIG. 20 is a block diagram of an example application server 810. The blocks that make up this block diagram may be implemented in software, hardware, middleware, or some other suitable embodiment. Illustrated is a rendering engine 2001 to render an application GUI (e.g., a CRM-UI) to be modified to reflect a use case, and a guide engine 2002 to initiate a guided procedure, the guided procedure relating to the use of an elected privilege to modify the application GUI. Further illustrated is a template generator 2003 to generate a template to be used in modifying the application GUI, the template containing a UI element and a layout element, and a modifying engine 2004 to modify the UI element and the layout element to reflect the use case, the modifying governed by the elected privilege. Additionally, an input receiver 2005 is illustrated to receive input to directly modify the application GUI to reflect the use case, the modification governed by the elected privilege. Moreover, a message generator 2006 is illustrated to generate a message prompt to be displayed on the application GUI, the message prompt existing as a part of the guided procedure. A UI element engine 2007 is illustrated to modify a UI element based upon the elected privilege, the elected privilege including at least one of a read-only privilege, an edit privilege, a delete privilege, a repositioning privilege, or a guide privilege. Additionally, a layout element engine 2008 is shown to modify a layout element based upon the elected privilege, the privilege including at least one of a read-only privilege, an edit privilege, a delete privilege, a repositioning privilege, or a guide privilege.

Figure 21:
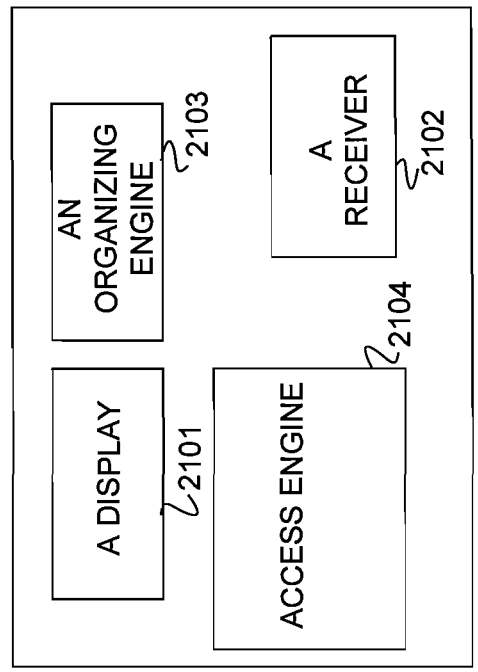
FIG. 21 is a block diagram of an application server, according to an example embodiment.

FIG. 21 is an example block diagram of an application server 802. The blocks that make up this block diagram may be implemented in software, hardware, middleware or some other suitable embodiment. Illustrated is a display 2101 to show a configuration rule within a UI, the configuration rule used to govern a UI configuration. Further a receiver 2102 is illustrated that receives a configuration rule selection as an elected privilege relating to modifying a UI element and a layout element, and storing the elected privilege. Also illustrated is an organizing engine 2103 to organize the UI element and the layout element into a hierarchy. Further, an access engine 2104 is shown to that provides access to various levels of the hierarchy, the access based upon the elected privilege relating to the modifying of the UI element and the layout element.

Figure 22:
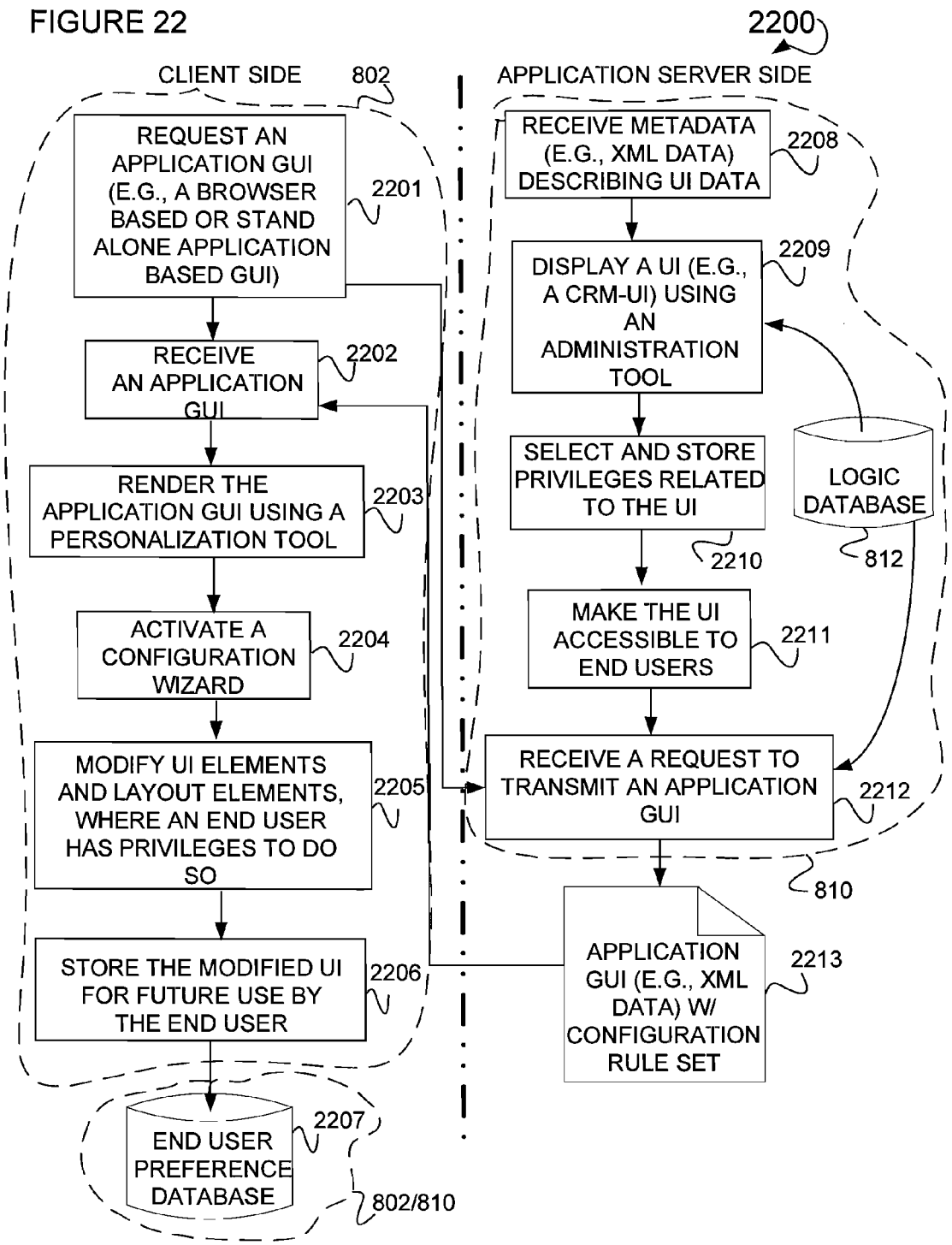
FIG. 22 is a dual stream flowchart illustrating a method to utilize a personalization tool, according to an example embodiment.

Example Logic Supporting a System for Implementing a Model for Generating a Personalized UI FIG. 22 is a dual stream flowchart illustrating an example method 2200 to utilize a personalization tool. Starting with the first stream titled "Client Side," a number of operations are illustrated. An operation 2201 is illustrated wherein a request is made for an application GUI. In some cases, this application GUI may be a browser-based UI, or, in some cases, may be a standalone application-based UI. Further, an operation 2202 may be executed that receives this application GUI. In some cases this operation 2202 receives an application GUI, such as application GUI 2213 from, for example, an application server such as application server 810. Once the application GUI is received, an operation 2203 is executed that renders the application GUI using the previously illustrated UI 100 (see e.g., FIG. 1). In some cases, an operation 2204 is executed that activates a configuration wizard wherein a configuration wizard may be activated through selecting a configuration wizard check box 101. This configuration wizard may allow a user, such as end user 706, to select any one of a number of templates (e.g., 200-600), or may just provide for a number of prompts in the form of message prompts to be associated with certain UI elements such as end user 706 may access using an input device such as a mouse. (See e.g., FIG. 1 illustrating prompts 102, 103, 113, and 114). Further, an operation 2205 may be executed that allows for the modification of certain UI elements and layout elements, where a user has the privileges to do so. In some cases, this denotes privileges generated by administrator 702, as has been previously illustrated. (See e.g., FIGS. 12 and 13). Further, an operation 2206 may be executed that allows for the storing of the personalized and/or modified UI for future use by an end user such as end user 706. This storage may be in the form of an end user preference database 2207 that may reside on any one of the number of devices 802, or on the previously illustrated application server 810.

In some embodiments, an "Application Server Side" is referenced as the second stream of the dual stream flowchart illustrating method 2200. For example, an operation 2208 may be executed that receives metadata in the form of metadata illustrating a particular UI application interface (see e.g., FIG. 8). An operation 2209 is executed that renders a UI using an administration tool. (See e.g., FIG. 10). During the course of rendering this UI administration tool, a logic database 812 may be accessed to define the metes and bounds of the display logic and business logic. The display logic that may be associated with a particular UI element, and/or a layout element. Put another way, the logic of a particular UI (e.g., CRM-UI) may dictate the extent to which certain privileges may, or may not, be granted by an administrator 702 to an end user 706. Further, an operation 2210 may be executed to set (e.g., select and store) certain privileges relating to a UI. (See e.g., FIGS. 12, 13 and 14). An operation 2211 may be executed that makes a particular UI accessible to an end user such as end user 706. (See e.g., FIGS. 1-6). Next, an operation 2212 may be executed that receives a request from, for example, an end user 706 for a particular application GUI wherein this application GUI (e.g., 2213) may be transmitted for use by the end user 706. In some cases, operations 2201-2206 may reside on any one of the number of the devices 802, whereas operations 2208-2212 may reside on previously illustrated application server 810.

FIG. 23 is a flowchart depicting an example method used to implement the operation 2201 of FIG. 22. Illustrated is an operation 2301 that initiates a session, wherein the session may be some type of web based session including a session utilizing a Transmission Control Protocol/Internet Protocol (TCP/IP) session. Next, an operation 2302 may be executed wherein an end user 706 may request an application GUI to serve as a UI for that end user 706. This application GUI may be, as previously illustrated, a browser based UI (e.g., a Hyper Text Markup Language (HTML) based interface), or some type of standalone application using an interface (e.g., an Advanced Business Application Programming (ABAP) form, a Java form (an Applet), C# form, or VB form), or some other suitable standalone application GUI.

FIG. 24 is a dual stream flowchart depicting an example method used to implement operation 2204. Illustrated is a first stream titled: "Client Side" containing a number of operations (e.g., 2401-2405) that reside on any one of a number of devices 802. Further illustrated is a second stream titled: "Application Server Side", wherein a number of operations (e.g., 2406 and 2408) are illustrated as residing on the previously illustrated application server 810. Starting with the first stream (e.g., "Client Side"), an operation 2401 receives application GUI data. Once received, an operation 2402 is executed that renders the UI data on a display using a personalization tool (e.g., UI 100). This personalization tool may be, for example, some type of interactive HTML interpreter. Next, an operation 2403 is executed that allows for the selecting of a UI element so as to activate a configuration wizard, via, for example, a configuration wizard checkbox 101. As previously illustrated, this UI element may be a radio button, checkbox, or some other suitable UI element, and may be activated with some type of suitable input device (e.g., mouse, or trackball). Then, an operation 2404 is executed that allows for the retrieving of a configuration rule, or a configuration rules set illustrating the privileges associated with a particular end user, such as end user 706. Further, the way in which the end user 706 may personalize or otherwise configure a particular UI may also be provided. Next, an operation 2405 is executed that allows for the receiving and displaying of rules to a particular end user such as end user 706. These rules may be displayed as, for example, popup templates or static templates (e.g., FIGS. 2-5), or may be some type of popup prompt as previously illustrated in FIG. 1 (see e.g., 102, 103, and/or 114).

Some embodiments may include various operations associated with application server 810 and the second stream of the dual stream flow chart titled: "Application Server Side". An operation 2406 is illustrated that receives a request for a configuration rule set, and retrieves this configuration rule set. Further, an operation 2408 is executed that actually performs the retrieving and transmission of this configuration rule set by retrieving this configuration rule set from a configuration rules database 2407. In some cases this configuration rules database 2407 may be some type of persistent or non-persistent data storage medium. In some cases, this configuration rule set is retrieved as a configuration rule set description 2409, wherein this configuration rule set description may be data formatted as, for example, an XML, MXML file, or some other suitable type of file format (e.g., a delimited flat file).

Figure 25:
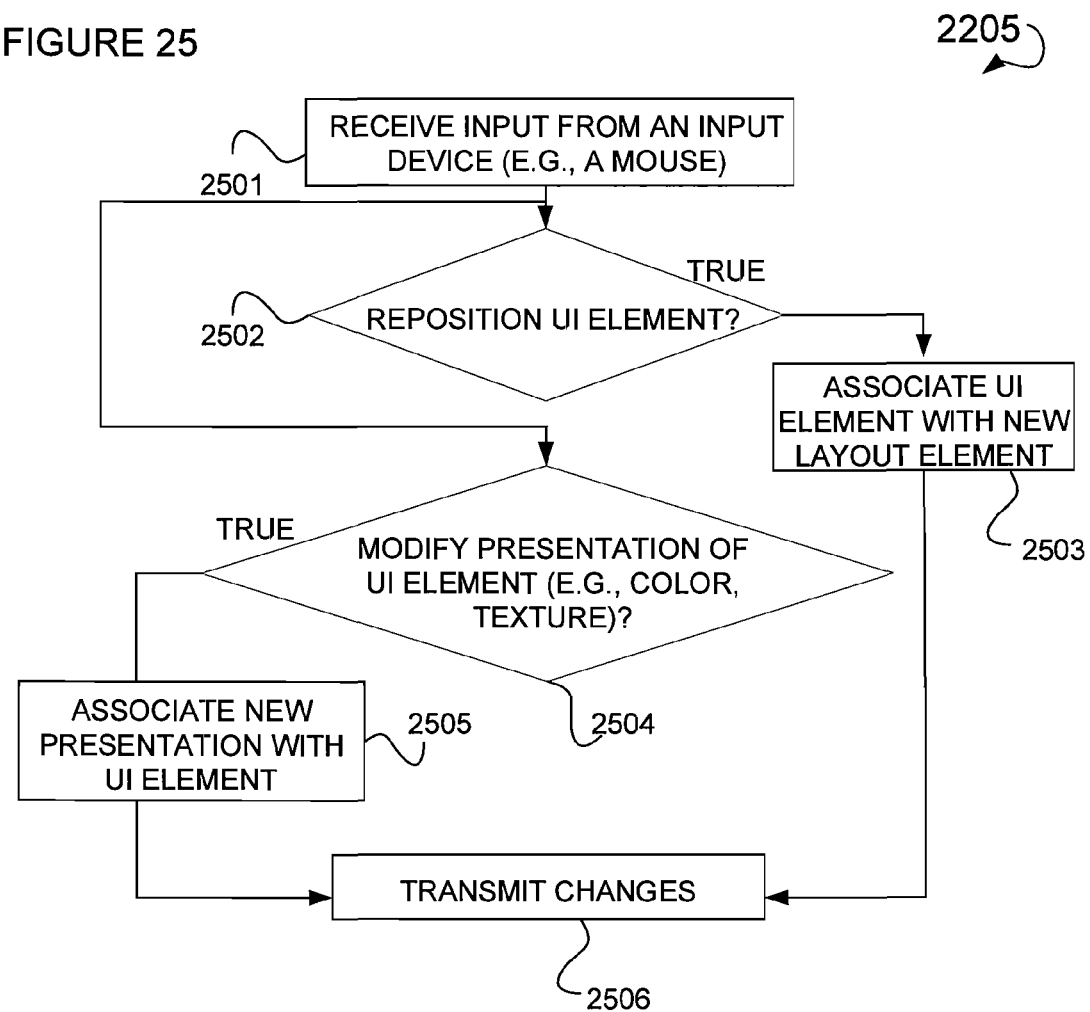
FIG. 25 is a flowchart depicting a method used to implement operation that allows for the modification of certain UI elements and layout elements where a user has to privileges to do so, according to an example embodiment.

FIG. 25 is a flowchart depicting an example method used to implement operation 2205. Illustrated is an operation 2501 that receives an input from an input device such as a mouse, trackball, light pen or other suitable input device. This input may be provided by, for example, an end user 706 using one of these devices (e.g., mouse, trackball, light pen or other suitable input device). Then, a decisional operation 2502 is executed wherein if this decisional operation 2502 evaluates to "true", a UI element is repositioned to be associated with a new layout element as reflected in operation 2503. Once this new association occurs by virtue of operation 2503, a further operation 2506 is executed that transmits this new association. In some cases, a decisional operation 2504 is executed that, where it evaluates to "true", a modification is allowed of the color or texture of a particular UI element such that this color or texture may be changed. In cases where decisional operation 2504 evaluates to "true", an operation 2505 is executed that associates this new color or texture with the UI element subsequent to which an operation 2506 is executed that transmits these changes. In some embodiments, decisional operation 2502 and 2504 may be implemented as a series of case statements, as is known in the art, or as a series of consecutive conditional statements. Further, in some embodiments, a layout element may be repositioned through the use of a input device such as a mouse, trackball, light pen, or other suitable input device. This repositioning may include the resizing of the layout element, or associating the layout element with a new of different UI element.

Figure 26:
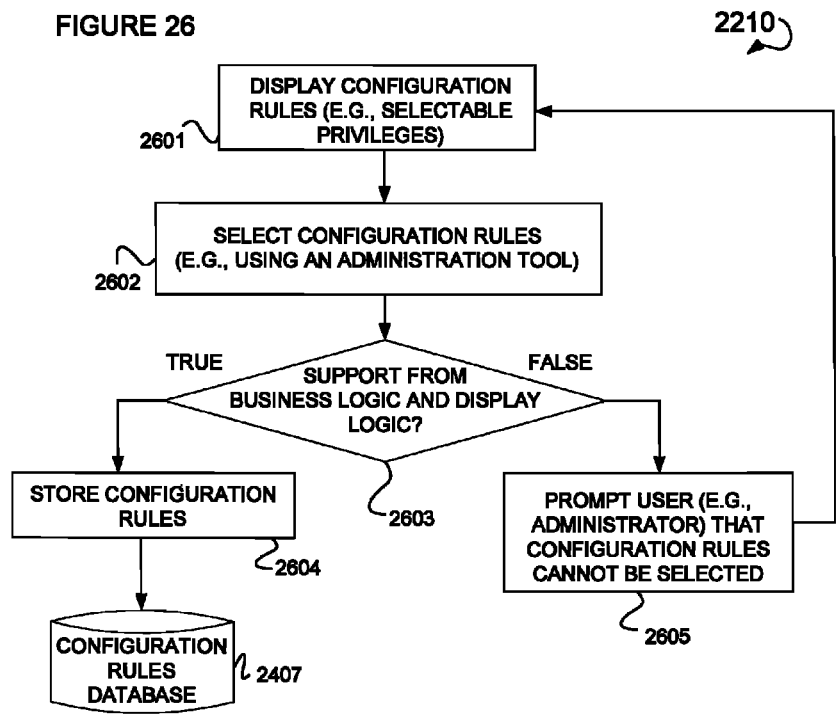
FIG. 26 is a flowchart illustrating a method used to implement an operation to set certain privileges relating to a UI relating to UI elements and/or layout elements, according to an example embodiment.

FIG. 26 is a flowchart illustrating an example method used to implement operation 2210. Illustrated is an operation 2601 that displays certain configuration rules (e.g., selectable privileges that are selected by, for example, an administrator 702). Next, an operation 2602 is executed that allows for the actual selecting of certain configuration rules using, for example, an administration tool as illustrated in, for example, 1001. Next, a decisional operation 2603 is executed that determines whether or not business logic, and/or display logic exists to support the particular privilege that has been selected. In certain instances, a privilege may not be offered to the end user 706, where the privilege is inconsistent with the business or display logic. In cases where a decisional operation 2603 evaluates to "true", an operation 2604 is executed that stores these configuration rules (e.g., the selected privileges) to configuration rules database 2407. In some cases, this configuration rules database 2407 may be some type of persistent or non-persistent storage medium. In cases where decisional operation 2603 evaluates to "false", an operation 2605 is executed that prompts the user (e.g., the administrator 702) that a configuration rule cannot be selected (e.g., the privilege does not exists), wherein the administrator 702 is re-prompted by operation 2601.

Figure 27:
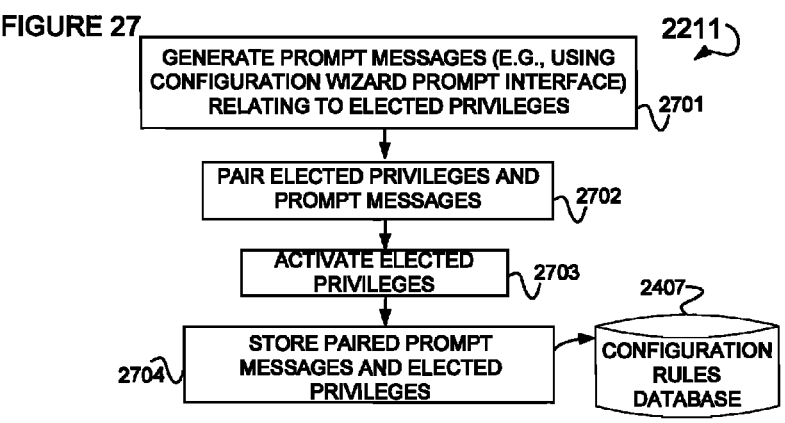
FIG. 27 is a flowchart illustrating a method used to implement an operation that makes a particular UI accessible to an end user, according to an example embodiment.

FIG. 27 is a flowchart illustrating an example method used to implement operation 2211. Illustrated is an operation 2701 that generates certain prompt messages relating to elected privileges. These prompt messages may be, for example, prompt messages 102, 103 and/or 114. Further, an operation 2702 is executed that pairs the elected prompt messages with certain elected privileges (see e.g., FIG. 14). Further, an operation 2703 may be executed that activates certain elected privileges. In some cases where operation 2703 is executed, the end user 706 may be able to actually see the prompts associated with certain UI elements, and/or may be able to access certain types of templates (e.g., FIGS. 2-5). An operation 2704 is executed that stores the pairing of prompt messages and elected privileges into, for example, a configuration rules database 2407.

Some embodiments may include a method including rendering an application GUI (see e.g., operation 2203) to be modified to reflect a use case, and initiating a guided procedure (see e.g., operation 2204) relating to the use of an elected privilege to modify the application GUI. Further, this method may include generating a template (see e.g., operation 2405) to be used in modifying the application GUI, the template containing a UI element and a layout element, and modifying the UI element and the layout element (see e.g., operation 2205) to reflect the use case, the modifying governed by the elected privilege. Moreover, this method may include receiving input to directly modify the application GUI to reflect the use case, the modification governed by the elected privilege. (See e.g., operation 2205). Additionally, this method may include generating a message prompt to be displayed on the application GUI, the message prompt existing as a part of the guided procedure (e.g., using a configuration wizard). (See e.g., operation 2405). Further, the method may include modifying a UI element based upon the elected privilege (see e.g., operation 2205), the elected privilege including at least one of a read-only privilege, an edit privilege, a delete privilege, a repositioning privilege, or a guide privilege. The method may further include modifying a layout element based upon the elected privilege (see e.g., 2205), the privilege including at least one of a read-only privilege, an edit privilege, a delete privilege, a repositioning privilege, or a guide privilege. According to the method, this UI element may be a CRM-UI.

Example embodiments may include a method including displaying a configuration rule (see e.g., operation 2209) as a part of a UI, the configuration rule used to govern a UI configuration, detecting a selection of the configuration rule as an elected privilege relating to modifying a UI element and a layout element, and storing the elected privilege. (See e.g., 2210) Additionally, the method further includes organizing the UI element and the layout element into a hierarchy. Further, the method may include providing access to various levels of the hierarchy, the access based upon the elected privilege relating to the modifying of the UI element and the layout element.

An Example Database Schema

Figure 28:
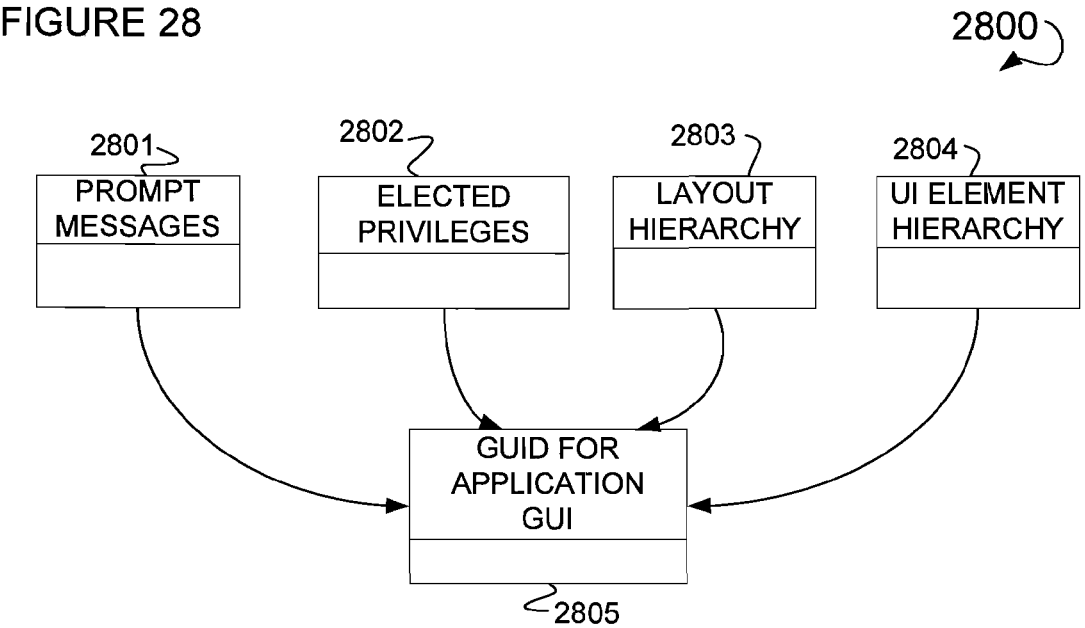
FIG. 28 is a diagram of a Relational Data Schema (RDS) illustrating various database tables containing, among other things, privileges associated with the UI element, according to an example embodiment.

FIG. 28 is an example RDS 2800 illustrating various privileges associated with the UI element. Illustrated is a table 2801 containing prompt messages, wherein these prompt messages may be in the form of some type of data stored as a string or series of characters. Further, a table 2802 is illustrated that provides for certain elected privileges, where these certain elected privileges may be, for example, some type of bit flag, boolean, or other type of value used to denote an elected privilege. Further, a table 2803 is provided that describes a layout hierarchy. This layout hierarchy may be in the form of, for example, a Binary Large Object (BLOB), or some other type of data structure in the aforementioned and illustrated hierarchies (see e.g., FIGS. 15-18). Further, a table 2804 is illustrated that provides for a UI element hierarchy, wherein this UI element hierarchy may be in the form of a BLOB, or some other suitable data structure that may capture the UI element hierarchy (e.g., FIG. 15). Next, a table 2805 provides certain types of constraint values for the previously illustrated tables (e.g., 2801-2804). These constraint values may be in the form of a Globally Unique Identifier (GUID) that will uniquely identify each application GUI and the various tables and data types and data contained each of one of these tables.

Figure 29:
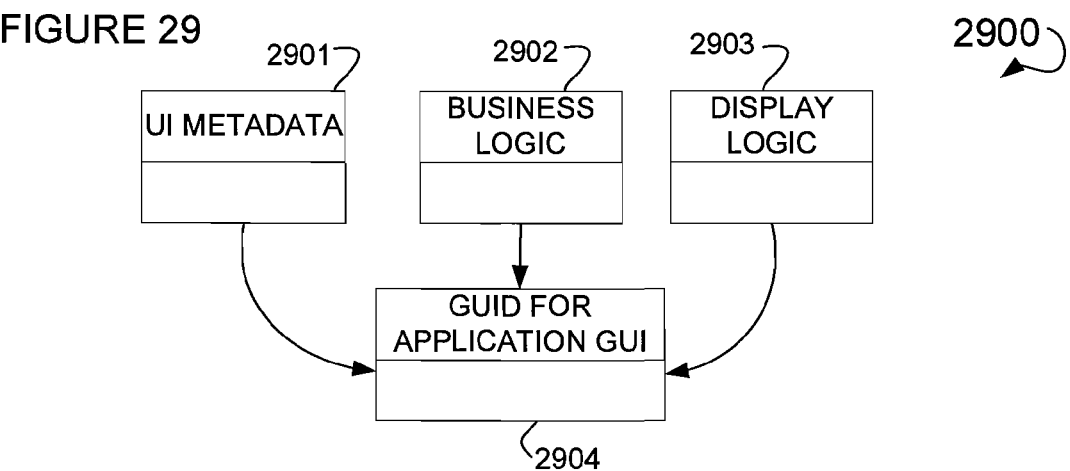
FIG. 29 is a diagram of an RDS illustrating certain types of database tables containing, among other things, business and display logic used to control UI elements and layout elements, according to an example embodiment.

FIG. 29 is an example RDS 2900 illustrating certain types of data tables that may appear in, for example, a database. Illustrated is a table 2901 that contains various types of UI metadata where this UI metadata may be stored in, for example, an XML data type, a BLOB data type, or some other suitable data type that may be able to accommodate metadata such as XML and/or MXML data. Further, a table 2902 is illustrated that contains business logic, wherein this business logic may be encoded into some type of binary format. In cases where a binary format may be used, then a BLOB data type may be used to accommodate this format. Further, a table 2903 is illustrated that contains display logic, wherein this display logic may be in the form of, for example, logic accommodated in the binary format. Similarly, this display logic, and the data contained therein, may be accommodated by a BLOB data type. A table 2904 may be used to provide a constraint value for each of the portions of data contained in each one of the tables 2901-2903. This constraint value may be in the form of a GUID value that uniquely identifies a particular application GUI and the data used to create this UI.

Figure 30:
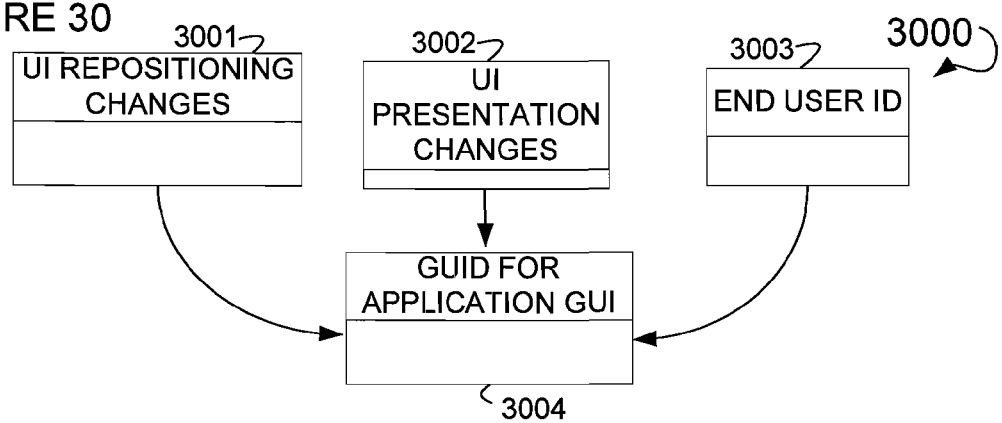
FIG. 30 is a diagram of an RDS illustrating certain types of database tables containing, among other things, end user preferences for the positioning of UI and layout elements, according to an example embodiment.

FIG. 30 is an example RDS 3000. Illustrated is a table 3001 wherein this table contains data relating to the repositioning of a particular UI element relative to a layout element. This data may be in the form of metadata, or some other data such that an XML, BLOB, or other suitable data type may be used to accommodate this UI repositioning data. Next, table 3002 is illustrated that accommodates data relating to UI presentation changes. In some cases, the presentation of a user interface may occur due to, for example, an end user 706 changing the color or texture of a particular UI element. This data may be in the form of, for example, a string, BLOB, or other suitable data type. Then, a table 3003 is illustrated that contains end user ID. In some cases, the ID of a particular end user, such as end user 706, may be needed to be known such that when the end user 706 accesses a particular user interface (e.g., CRM-UI) that his or her settings (e.g., particular personalization settings) may be known. Put another way, the end user ID may be used to access or uniquely identify a particular end user's personalization desires, or requests as associated with a particular UI (e.g., CRM-UI). (See e.g., generally end user preference database 2207) As with the previously illustrated RDSs (e.g., 2800, and 2900) a GUID may be used as a constraint value to uniquely identify each one of the data entries contained in each one of the tables (e.g., 3001-3003). With regard to each one of the RDSs (e.g., 2800-3000) each table may contain a number of entries in the form of tuples as are known in the art.

Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier and/or to a backend, or storage tier. These logical/mathematical manipulations may relate to certain business rules or processes that govern the software application as a whole. A third storage tier may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between more than one computer system as various software components.

Component Design

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

A Computer System

FIG. 31 shows a diagrammatic representation of a machine in the example form of a computer system 3100 that executes a set of instructions to perform any one or more of the methodologies discussed herein. One of the devices 602 may be configured as a computer system 3100. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 3100 includes a processor 3102 (e.g., a Central Processing Unit (CPU), a Graphics Processing Unit (GPU) or both), a main memory 3101, and a static memory 3106, which communicate with each other via a bus 3108. The computer system 3100 may further include a video display unit 3110 (e.g., a Liquid Crystal Display (LCD) or a Cathode Ray Tube (CRT)). The computer system 3100 also includes an alpha-numeric input device 3117 (e.g., a keyboard), a UI cursor control device 3111 (e.g., a mouse), a disk drive unit 3116, a signal generation device 3128 (e.g., a speaker), and a network interface device (e.g., a transmitter) 3120.

The disk drive unit 3116 includes a machine-readable medium 3122 on which is stored one or more sets of instructions and data structures (e.g., software) embodying or used by any one or more of the methodologies or functions illustrated herein. The software may also reside, completely or at least partially, within the main memory 3101 and/or within the processor 3102 during execution thereof by the computer system 3100, the main memory 3101 and the processor 3102 also constituting machine-readable media.

The instructions 3121 may further be transmitted or received over a network 3131 via the network interface device 3120 using any one of a number of well-known transfer protocols (e.g., Hyper Text Transfer Protocol (HTTP), Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any of the one or more methodologies illustrated herein. The term "machine-readable medium" shall accordingly be taken to include, but not be limited to, solid-state memories and optical and magnetic media.

Marketplace Applications

One exemplary advantage of an embodiment of the present system and method is that one embodiment of the present system and embodiment allows for the customization of a UI by an end user. Many UIs for software applications in the enterprise context have a static UI that forces an end user to adapt to the layout and functionality of this static UI, even though this UI may not precisely reflect the various use cases that an end user may encounter during the course of performing their job. This failure in being able to precisely accommodate a use case may result in an end user having to spend time to learn a completely new UI, thus taking away from time spent on more productive endeavors (e.g., performing their job). In some embodiments, the end user is provided one or more templates (see e.g., FIGS. 2-5) to customize a UI to reflect the particular use case for an end user's job. Further, in some embodiments, the end user may be able to directly modify an existing UI (e.g., a CRM-UI) to reflect their needs. (See e.g., FIG. 1).

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
rendering an application User Interface (UI) to be modified to reflect a use case;
initiating a guided procedure relating to the use of an elected privilege of an end user to modify the application UI and to receive UI modification input modifying properties of at least one of a UI element and a layout element of the UI, the elected privilege of the end user allowing the end user to reposition at least one UI or layout element while also preventing the end user from repositioning at least one other UI or layout element; and
storing received UI modification input.

2. The method of claim 1, further comprising:
generating a template to be used in modifying the application UI, the template containing a UI element and a layout element; and
modifying the UI element and the layout element to reflect the use case, the modifying governed by the elected privilege.

3. The method of claim 1, further comprising receiving input to directly modify the application UI to reflect the use case, the modification governed by the elected privilege.

4. The method of claim 1, further comprising generating a message prompt to be displayed on the application UI, the message prompt existing as a part of the guided procedure.

5. The method of claim 1, further comprising modifying a UI element based upon the elected privilege, the elected privilege including at least one of a read-only privilege, an edit privilege, a delete privilege, a repositioning privilege, or a guide privilege.

6. The method of claim 1, further comprising modifying a layout element based upon the elected privilege, the privilege including at least one of a read-only privilege, an edit privilege, a delete privilege, a repositioning privilege, or a guide privilege.

7. The method of claim 1, wherein the UI is a Customer Relationship Management (CRM) UI.

8. A computer system comprising:
at least one processor;
at least one memory device;
a first instruction set stored in the at least one memory device, the first instruction set executable by the at least one processor to render an application User Interface (UI) to be modified to reflect a use case; and
a second instruction set stored in the at least one memory device, the second instruction set executable by the at least one processor to initiate a guided procedure, the guided procedure relating to use of an elected privilege of an end user to modify the application UI and to receive UI modification input modifying properties of at least one of a UI element and a layout element of the UI, the elected privilege of the end user allowing the end user to reposition at least one UI or layout element while also preventing the end user from repositioning at least one other UI or layout element.

9. The computer system of claim 8, further comprising:
a third instruction set stored in the at least one memory device, the third instruction set executable by the at least one processor to generate a template to be used in modifying the application UI, the template containing a UI element and a layout element; and
a fourth instruction set stored in the at least one memory device, the fourth instruction set executable by the at least one processor to modify the UI element and the layout element to reflect the use case, the modifying governed by the elected privilege.

10. The computer system of claim 8, further comprising:
a third instruction set stored in the at least one memory device, the third instruction set executable by the at least one processor to receive input to directly modify the application UI to reflect the use case, the modification governed by the elected privilege.

11. The computer system of claim 8, further comprising:
a third instruction set stored in the at least one memory device, the third instruction set executable by the at least one processor to generate a message prompt to be displayed on the application UI, the message prompt existing as a part of the guided procedure.

12. The computer system of claim 8, further comprising:
a third instruction set stored in the at least one memory device, the third instruction set executable by the at least one processor to modify a UI element based upon the elected privilege, the elected privilege including at least one of a read-only privilege, an edit privilege, a delete privilege, a repositioning privilege, or a guide privilege.

13. The computer system of claim 8, further comprising:
a third instruction set stored in the at least one memory device, the third instruction set executable by the at least one processor to modify a layout element based upon the elected privilege, the privilege including at least one of a read-only privilege, an edit privilege, a delete privilege, a repositioning privilege, or a guide privilege.

14. The computer system of claim 8, wherein the application UI is a Customer Relationship Management (CRM) UI.

15. An apparatus comprising:
at least one processor;
at least one memory device storing instructions executable by the processor to receive input, process the input, and provide output;
means for rendering an application User Interface (UI) to be modified to reflect a use case; and
means for initiating a guided procedure, the guided procedure relating to use of an elected privilege of an end user to modify the application UI and to receive UI modification input modifying properties of at least one of a UI element and a layout element of the UI, the elected privilege of the end user allowing the end user to reposition at least one UI or layout element while also preventing the end user from repositioning at least one other UI or layout element; and
means for storing the received UI modification input.

16. A non-transitory machine-readable medium comprising instructions, which when implemented by one or more machines, cause the one or more machines to perform the following operations:
rendering an application User Interface (UI) to be modified to reflect a use case; and
initiating a guided procedure relating to the use of an elected privilege of an end user to modify the application UI and to receive UI modification input modifying at least one of a UI element and a layout element of the UI, the elected privilege of the end user allowing the end user to reposition at least one UI or layout element while also preventing the end user from repositioning at least one other UI or layout element.

17. A method comprising:
rendering an application user interface (UI) to be modified to reflect a use case; and
initiating a guided procedure allowing an end user to modify the application UI, the procedure providing the end user with options for modifying properties of at least one of UI elements and layout elements where the user has privileges to do so.

18. The method of claim 17, wherein the guided procedure relates to an elected privilege.

19. The method of claim 18, further comprising:
generating a template to be used in modifying the application UI, the template containing a UI element and a layout element; and
modifying the UI element and the layout element to reflect the use case, the modifying governed by the elected privilege.

* * * * *